United States Patent
Grigsby

(10) Patent No.: US 10,696,882 B2
(45) Date of Patent: Jun. 30, 2020

(54) ADHESIVE

(71) Applicant: NEW ZEALAND FOREST RESEARCH INSTITUTE LIMITED, Rotorua (NZ)

(72) Inventor: Warren James Grigsby, Rotorua (NZ)

(73) Assignee: NEW ZEALAND FOREST RESEARCH INSTITUTE LIMITED, Rotorua (NZ)

(*) Notice: Subject to any disclaimer, the term of this patent is extended or adjusted under 35 U.S.C. 154(b) by 487 days.

(21) Appl. No.: 15/106,026

(22) PCT Filed: Dec. 19, 2014

(86) PCT No.: PCT/IB2014/067102
§ 371 (c)(1),
(2) Date: Jun. 17, 2016

(87) PCT Pub. No.: WO2015/092750
PCT Pub. Date: Jun. 25, 2015

(65) Prior Publication Data
US 2016/0333240 A1    Nov. 17, 2016

(30) Foreign Application Priority Data

Dec. 20, 2013 (NZ) .................................... 619348

(51) Int. Cl.
| | | |
|---|---|---|
| *C08L 97/02* | (2006.01) | |
| *C08L 1/02* | (2006.01) | |
| *C08L 1/08* | (2006.01) | |
| *C09J 189/00* | (2006.01) | |
| *B27N 3/00* | (2006.01) | |
| *C09J 101/02* | (2006.01) | |
| *C09J 105/08* | (2006.01) | |
| *C09J 189/04* | (2006.01) | |
| *C09J 105/06* | (2006.01) | |
| *C09J 105/00* | (2006.01) | |
| *C09J 197/00* | (2006.01) | |
| *C09J 105/04* | (2006.01) | |
| *C09J 103/12* | (2006.01) | |
| *C09J 105/12* | (2006.01) | |
| *C09J 101/28* | (2006.01) | |
| *C09J 103/04* | (2006.01) | |
| *C09J 103/14* | (2006.01) | |
| *C09J 101/08* | (2006.01) | |
| *C09J 103/02* | (2006.01) | |

(Continued)

(52) U.S. Cl.
CPC ............ *C09J 189/00* (2013.01); *B27N 3/002* (2013.01); *C08J 7/0427* (2020.01); *C08L 1/02* (2013.01); *C08L 1/08* (2013.01); *C08L 1/286* (2013.01); *C08L 3/02* (2013.01); *C08L 3/04* (2013.01); *C08L 3/12* (2013.01); *C08L 3/14* (2013.01); *C08L 5/00* (2013.01); *C08L 5/04* (2013.01); *C08L 5/06* (2013.01); *C08L 5/08* (2013.01); *C08L 5/12* (2013.01); *C08L 89/00* (2013.01); *C08L 89/005* (2013.01); *C08L 89/04* (2013.01); *C08L 97/005* (2013.01); *C08L 97/02* (2013.01); *C09J 101/02* (2013.01); *C09J 101/08* (2013.01); *C09J 101/286* (2013.01); *C09J 103/02* (2013.01); *C09J 103/04* (2013.01); *C09J 103/12* (2013.01); *C09J 103/14* (2013.01); *C09J 105/00* (2013.01); *C09J 105/04* (2013.01); *C09J 105/06* (2013.01); *C09J 105/08* (2013.01); *C09J 105/12* (2013.01); *C09J 189/005* (2013.01); *C09J 189/04* (2013.01); *C09J 197/005* (2013.01); *C08J 2397/02* (2013.01); *C08J 2489/00* (2013.01)

(58) Field of Classification Search
None
See application file for complete search history.

(56) References Cited

U.S. PATENT DOCUMENTS 5,858,553 A * 1/1999 Wu ........................ C08G 8/26
428/524
7,183,339 B2    2/2007 Shen et al.
(Continued)

FOREIGN PATENT DOCUMENTS

JP    S5164545 A *  6/1976  ............... C08K 5/00
JP    2006-70081 A   3/2006
(Continued)

OTHER PUBLICATIONS

Communication dated Mar. 2, 2016 from the New Zealand Intellectual Property Office in counterpart application No. 703241.
(Continued)

*Primary Examiner* — Peter A Salamon
(74) *Attorney, Agent, or Firm* — Sughrue Mion, PLLC

(57) ABSTRACT

An aqueous adhesive composition and a process for preparing such compositions are disclosed. The composition comprises macromolecular complex comprising (A) a first component comprising (i) a framework element and (ii) a polyphenol, and (B) second component comprising a polypeptide, oligopeptide, amino acid, or polyamine. The framework element comprises (a) a polypeptide, oligopeptide, amino acid, or polyamine, (b) a polysaccharide, oligosaccharide, or monosaccharide, or a saccharide conjugate, or (c) a lignin, a lignan or a lignin conjugate. The polyphenol comprises a tannin, a tannic acid, a flavonoid, or a polyresorcinol. An adhesive precursor composition comprising the first component is also disclosed.

29 Claims, No Drawings

(51) Int. Cl.

| | |
|---|---|
| C08L 5/04 | (2006.01) |
| C08L 5/00 | (2006.01) |
| C08L 3/12 | (2006.01) |
| C08L 89/00 | (2006.01) |
| C08L 3/14 | (2006.01) |
| C08L 5/08 | (2006.01) |
| C08L 97/00 | (2006.01) |
| C08L 1/28 | (2006.01) |
| C08L 89/04 | (2006.01) |
| C08L 5/12 | (2006.01) |
| C08L 3/04 | (2006.01) |
| C08L 3/02 | (2006.01) |
| C08L 5/06 | (2006.01) |
| C08J 7/04 | (2020.01) |

(56) References Cited

U.S. PATENT DOCUMENTS

| | | | |
|---|---|---|---|
| 7,252,735 B2 | 8/2007 | Li | |
| 8,268,102 B2 | 9/2012 | Li | |
| 2002/0039661 A1* | 4/2002 | Matuana | B27D 1/00 428/528 |
| 2004/0089418 A1 | 5/2004 | Li | |
| 2004/0259218 A1* | 12/2004 | Weimer | C09J 5/00 435/170 |
| 2006/0276570 A1* | 12/2006 | Grigsby | C08L 97/00 524/72 |
| 2008/0063884 A1* | 3/2008 | Robinson | B27K 3/163 428/541 |
| 2010/0087571 A1* | 4/2010 | Jackson | B27N 3/002 524/13 |
| 2010/0258033 A1 | 10/2010 | Yang et al. | |
| 2013/0065012 A1 | 3/2013 | Parker et al. | |
| 2015/0086775 A1 | 3/2015 | Allen et al. | |
| 2016/0186018 A1* | 6/2016 | Mikkonen | C08B 31/10 106/145.5 |
| 2016/0333240 A1* | 11/2016 | Grigsby | B27N 3/002 |
| 2019/0048239 A1* | 2/2019 | Parker | B32B 7/12 |

FOREIGN PATENT DOCUMENTS

| | | |
|---|---|---|
| JP | 2007-002084 A | 1/2007 |
| WO | 2005/072260 A2 | 8/2005 |
| WO | 2007/149589 A2 | 12/2007 |
| WO | 2011/001105 A1 | 1/2011 |
| WO | 2011/073531 A1 | 6/2011 |
| WO | 2012136894 A1 | 10/2012 |

OTHER PUBLICATIONS

Communication dated Oct. 31, 2016 from the New Zealand Intellectual Property Office in counterpart application No. 703241.
Communication dated Feb. 20, 2017 from the New Zealand Intellectual Property Office in counterpart application No. 703241.
Communication dated Feb. 28, 2017 from the New Zealand Intellectual Property Office in counterpart application No. 703241.
Communication dated Jul. 27, 2017 from the European Patent Office in counterpart application No. 14872725.8.
Mansouri et al., "Synthetic-resin-free wood panel adhesives from mixed low molecular mass lignin and tannin", Eur. J. Wood Prod., vol. 69, 2011, pp. 221-229.
Communication dated Aug. 1, 2017 from the State Intellectual Property Office of the P.R.C. in counterpart application No. 201480076048.9.
Nimz, "Lignin-Based Wood Adhesives", Ed. A. Pizzi, Marcel Dekker, New York, 1983, pp. 247-288.
Liu et al., "Preparation and Characterization Diethylenetriamine/ Formaldehyde Modified Lignin Amine", Transactions of China Pulp and Paper, vol. 20, No. 2, 2005, pp. 75-79.
Uprichard, Properties and uses of New Zealand Radiata Pine, Ed. J.A. Kinnimonth, L.J. Whitehouse, NZ Ministry of Forestry, vol. 1, 1991, Chapter 4, p. 11.
Lambuth, "Wood Adhesives Chemistry and Technology, vol. 2" Ed. A. Pizzi, Marcel Dekker, New York, 1989, Chapter 1, pp. 1-29.
Roffael et al., "Lignin and ligninsulfonate in non-conventional bonding—an overview*", Holz als Roh-und Werkstoff, vol. 49, 1991, pp. 199-205.
Lei et al., "Environmentally Friendly Mixed Tannin/Lignin Wood Resins", Journal of Applied Polymer Science, vol. 107, 2008, pp. 203-209.
Li et al., "Formaldehyde-Free Wood Adhesives from Decayed Wood", Macromolecular Rapid Communications, vol. 26, 2005, pp. 529-532.
Li et al., "Investigation of formaldehyde-free wood adhesives from kraft lignin and a polyaminoamide-epichlorohydrin resin", Journal of Adhesion Science and Technology, vol. 18, No. 4, 2004, pp. 427-439. (14 pages total).
Matsushita et al., "Application of cationic polymer prepared from sulfuric acid lignin as a retention aid for usual rosin sizes to neutral papermaking", J. Wood Sci., vol. 50, 2004, pp. 540-544.
Lambuth, "Adhesives from Renewable Resources Historical Perspective and Wood Industry Needs", ACS Symposium Series, 1989, pp. 1-10.
Wescott et al., "High-soy-containing water-durable adhesives", Journal of Adhesion Science and Technology, vol. 20, No. 8, 2006, pp. 859-873. (17 pages).
Hagerman, "Chemistry and Significance of Condensed Tannins", Ed. R.W. Hemingway, J.J. Karchesy, Plenum Press, New York, 1989, pp. 323-333.
Liu et al., "Preparation and Characterization of Demethylated Lignin-Polyethylenimine Adhesives", The Journal of Adhesion, vol. 82, 2006, pp. 593-605. (14 pages total).
Shukla et al., "Zein: the industrial protein from corn", Industrial Corps and Products, vol. 13, 2001, pp. 171-192.
Zhong et al., "Zein nanoparticles produced by liquid-liquid dispersion", Food Hydrocolloids, vol. 23, 2009, pp. 2380-2387.
Kuiken et al., "Essential Amino Acid Composition of Soy Bean Meals Prepared From Twenty Strains of Soy Beans*", J. Biol. Chem., vol. 177, 1949, pp. 29-36. (9 pages total).
https://solenis.com/en/industries/specialties-wood-adhesives/innovations/soyad-adhesive-technology/. (2 pages total).
Communication dated Oct. 31, 2017 from the Chilean Patent Office in counterpart application No. 201601557.
Communication dated Dec. 4, 2017 from the Intellectual Property Office of Australia in counterpart application No. 2014369112.
Lei, H. et al., "Gluten Protein Adhesives for Wood Panels", Journal of Adhesion Science and Technology, 2010, vol. 24, p. 1583-1596.
International Preliminary Report on Patentability dated Jun. 21, 2016, issued by the International Bureau in corresponding application No. PCT/IB2014/067102.

* cited by examiner

ADHESIVE

FIELD OF INVENTION

The invention relates to adhesives being particularly suited for use in the manufacture of lignocellulosic composites such as plywood, medium density fibreboard, particle board and veneers and for use in joining timber and packaging, and a process for manufacturing such composites.

BACKGROUND

Medium density fibre board, particle board, and other panel boards, plywood and veneers and similar engineered wood products are typically composed of lignocellulosic or cellulosic material of small dimension—whether as particles or sheets—combined with an adhesive or resin with the composition subsequently pressed or shaped into a panel or similar and heated to cure the adhesive to fix the shape and provide internal bonding.

In industry, the adhesives that are most commonly used are urea-formaldehyde (UF) resins and phenol-formaldehyde resins. Isocyanate resins are also used. Phenolic resins provide composite materials with superior material properties including stability, hardness and water resistance. UF resins provide good strength and are extremely cost competitive. But both resins have disadvantages. Both are synthetic resins derived from fossil fuels and both result in the formation and emission of volatile organic compounds, particularly formaldehyde, during both the manufacture and use of the resulting panels.

A resin that retains the material properties of UF and phenolic resins but is formaldehyde free and made from renewable or mostly renewable resources would potentially be of benefit to the wood composite industry, wood composite users, indoor living spaces and the environment. Ideally any such resin would be compatible with current production facilities and schedules particularly in regard to such matters as resin handling and application, pressing and curing. Ideally, it would also able to be formulated using typical adhesive manufacturing practice.

It is an object of the invention to provide an adhesive suitable for adhering wood and other lignocellulosic substrates that is preferably formaldehyde free or can be used to reduce formaldehyde emissions, and comprised substantially of renewable materials, or to at least provide the public with a useful choice.

SUMMARY OF THE INVENTION

In one aspect the present invention provides an aqueous adhesive composition comprising, consisting of, or consisting essentially of a macromolecular complex, the complex comprising:
(A) a first component comprising:
 (i) a framework element selected from
  (a) a polypeptide, oligopeptide, amino acid, polyamine, or any combination of any two or more thereof,
  (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule, and
  (c) a lignin, a lignan or a lignin conjugate comprising a lignin and a second linker molecule; and
 (ii) a polyphenol comprising a tannin, a tannic acid, a flavonoid, a poly-resorcinol or any combination of any two or more thereof; and
(B) a second component comprising a polypeptide, oligopeptide, amino acid, polyamine or any combination of any two or more thereof.

Any of the following embodiments may apply to any of the aspects described herein.

In one embodiment, the ratio of framework element to polyphenol is from about 20:1 to about 1:1, from about 20:1 to about 2:1, from about 15:1 to about 1:1, from about 15:1 to about 2:1, from about 10:1 to about 2:1, from about 10:1 to about 1:1, from about 7:1 to about 2:1, from about 7:1 to about 3:1, from about 6:1 to about 2:1, from about 6:1 to about 3:1, from about 5:1 to about 3:1, from about 4:1 to about 3:1, about 4:1 or about 3:1 by dry weight.

In one embodiment, the ratio of framework element (a) to polyphenol is from about 15.5:1 to about 2:1 by dry weight. In another embodiment, the ratio of framework element (a) to polyphenol is about 3.9:1 by dry weight.

In one embodiment, the ratio of frame work element (a) to polyphenol to second component is about 3-5:1:5.6 by dry weight.

In one embodiment, the ratio of framework element (b) to polyphenol is from about 3:1 to about 7:1 by dry weight. In some embodiments, the ratio is 5:1 by dry weight.

In one embodiment, the ratio of framework element (c) to polyphenol is from about 7:1 to about 2:1 by dry weight. In another embodiment, the ratio of framework element (c) to polyphenol is from about 6.3:1 to about 2.6:1 by dry weight. In another embodiment, the ratio of framework element (c) to polyphenol is from about 5.3:1 to about 3:1 by dry weight. In another embodiment, the ratio of framework element (c) to polyphenol is about 3.2:1 by dry weight.

In one embodiment, the ratio of polyphenol to second component is from about 1:1 to about 1:8, from about 1:2 to about 1:8, from about 1:1 to about 1:7, from about 1:2 to about 1:7, from about 1:3 to about 1:7, from about 1:1 to about 1:6, from about 1:2 to about 1:6, from about 1:3 to about 1:6, about 1:6, about 1:5, about 1:4, about 1:3, or about 1:2.

In one embodiment, the ratio of polyphenol to second component is from about 1:2 to about 1:6 by dry weight. In another embodiment, the ratio of polyphenol to second component is about 1:2.8 by dry weight.

In one embodiment, the ratio of second component to polyphenol is from about 3:1 to about 7:1 by dry weight. In another embodiment, the ratio of second component to polyphenol is from about 2.8:1 to about 6.7:1. In another embodiment, the ratio of second component to polyphenol is about 5.5:1.

In one embodiment, the ratio of second component to polyphenol is from about 2:1 to about 7:1 by dry weight. In some embodiments, the ratio of second component to polyphenol is about 5.6:1 by dry weight.

In some embodiments, the saccharide conjugate comprises a plurality of first linker molecules that may be the same or different.

In some embodiments, the lignin conjugate comprises a plurality of second linker molecules that may be the same or different.

In one embodiment, the first linker molecule and second linker molecule are each independently selected from:
(a) a polypeptide, oligopeptide, amino acid, or any combination of any two or more thereof;

(b) an inorganic polyhydroxylated non-metal compound or an ester or a salt thereof;
(c) an amine compound or a salt thereof;
(d) a thiol compound or a salt thereof;
(e) a metal ion;
(f) an aldehyde compound; or a carboxylic acid compound or a salt, ester, anhydride, or halide thereof; and
(g) any combination of any two or more thereof, for example any three, four, five, or six or more thereof.

In certain embodiments, the first linker molecule and second linker molecule are each independently selected from (a) to (g), wherein (f) is an aldehyde compound.

In some embodiments, the first linker molecule and/or the second linker molecule independently comprise two or more, for example three, four, five, or more, linker molecules contiguous to each other, preferably wherein the linker molecules are selected from (a) to (f).

In some embodiments, the saccharide conjugate comprises a first linker molecule comprising two or more, for example three, four, five, or more, linker molecules selected from (a) to (f) contiguous to each other.

In some embodiments, the lignin conjugate comprises a second linker molecule comprising two or more, for example three, four, five, or more, linker molecules selected from (a) to (f) contiguous to each other.

In one embodiment, the first linker molecule is selected from:
(b) an inorganic polyhydroxylated non-metal compound or an ester or a salt thereof; and
(e) a metal ion;
(g) any combination of any two or more thereof.

In another embodiment, the first linker molecule is an inorganic polyhydroxylated non-metal compound or an ester or a salt thereof.

In one embodiment, the inorganic polyhydroxylated non-metal compound or ester or salt thereof is a polyhydroxylated boron, phosphorus, silicon, or sulfur compound or an ester or salt thereof. In another embodiment, the inorganic polyhydroxylated non-metal compound or ester or salt thereof is a polyhydroxylated boron or phosphorus compound or an ester or a salt thereof.

In one embodiment, the inorganic polyhydroxylated non-metal compound or ester or salt thereof is an oxoacid of boron or phosphorus comprising two or more hydroxyl groups or an ester or a salt thereof. In one embodiment, the oxoacid is an orthoacid of boron or phosphorus or an ester or salt thereof.

In one embodiment, the inorganic polyhydroxylated non-metal compound or ester or salt thereof is boric acid, phosphoric acid, or an ester or a salt thereof. In one embodiment, the inorganic polyhydroxylated non-metal compound or ester or salt thereof is boric acid, or an ester or a salt thereof.

In one embodiment, the metal ion is capable of forming a metal chelate in the saccharide conjugate or lignin conjugate.

In one embodiment, the metal ion is an ion of a metal selected from groups 1 to 15 of the periodic table. In another embodiment, the metal is selected from periods 2 to 6 of groups 1 and 2, periods 4 to 6 of groups 3 to 12, periods 3 to 6 of group 13, or periods 4 to 6 of groups 14 and 15.

In one embodiment, the metal is an alkali metal, alkaline earth metal, transition metal, or base metal.

In one embodiment, the metal is lithium, sodium, potassium, magnesium, calcium, barium, titanium, vanadium, chromium, manganese, iron, cobalt, copper, zinc, zirconium, molybdenum, rhodium, silver, tungsten, osmium, rhenium, iridium, aluminium, lead, or bismuth. In another embodiment, the metal is lithium, sodium, potassium, magnesium, calcium, barium, titanium, chromium, manganese, iron, cobalt, copper, zinc, aluminium, lead, or bismuth. In another embodiment, the metal is lithium, sodium, potassium, magnesium, calcium, titanium, chromium, manganese, iron, cobalt, copper, zinc, aluminium, or lead. In another embodiment, the metal is calcium, chromium, iron, copper, zinc, or aluminium.

In some embodiments, the ratio of polyphenol to first linker molecule is from about 5:1 to about 40:1 by dry weight. In some embodiments, the ratio is from about 5:1 to about 30:1, from about 5:1 to about 20:1 from about 5:1 to about 10:1, from about 10:1 to about 40:1, from about 10:1 to about 30:1, or from about 10:1 to about 20:1.

In some embodiments, the second linker molecule is selected from:
(a) a protein, a polypeptide, oligopeptide, amino acid, or any combination of any two or more thereof;
(c) an amine compound or a salt thereof;
(d) a thiol compound or a salt thereof;
(f) an aldehyde compound; or a carboxylic acid compound or a salt, ester, anhydride or halide thereof; and
(g) any combination of any two or more thereof, for example any three or four or more thereof.

In some embodiments, the second linker molecule is selected from (a), (c), (d), (f), and (g) above, wherein (f) is an aldehyde compound.

In some embodiments, the second linker molecule is selected from:
(a) a protein, a polypeptide, oligopeptide, amino acid, or any combination of any two or more thereof; and
(c) an amine compound or a salt thereof
(f) an aldehyde compound; or a carboxylic acid compound or a salt, ester, anhydride or halide thereof; and
(g) any combination of any two or more thereof.

In some embodiments, the second linker molecule is selected from (a), (c), (f), and (g) above, wherein (f) is an aldehyde compound.

In some embodiments, the second linker molecule is selected from:
(a) a protein, a polypeptide, oligopeptide, amino acid, or any combination of any two or more thereof; and
(c) an amine compound or a salt thereof; and
(g) any combination of any two or more thereof.

In certain embodiments, the second linker molecule comprises two or more, for example three, four, five, or more, linker molecules selected from (b), (e) and a carboxylic acid compound or a salt, ester, anhydride or halide thereof contiguous to each other.

In some embodiments, the second linker molecule comprises an inorganic polyhydroxylated non-metal compound or ester or salt thereof and a carboxylic acid compound or a salt, ester, anhydride or halide thereof contiguous thereto.

In one embodiment, the amine compound comprises at least 2 carbon atoms.

In one embodiment, the amine compound comprises an amino group and at least one additional functional group capable of forming covalent or non-covalent bonds in the saccharide conjugate or lignin conjugate. In another embodiment, the at least one additional functional group is selected from the group consisting of amino, hydroxyl, and carboxyl.

In one embodiment, the amine compound is selected from a natural amino acid, an unnatural amino acid having at least 2 carbon atoms, a polyamine having at least 2 carbon atoms, and a hydroxyamine having at least 2 carbon atoms, or a salt thereof. In one embodiment, the polyamine is a diamine.

In some embodiments, the amine compound comprises from about 2 to about 12, from about 2 to about 10, from about 2 to about 8, or from about 2 to about 6 carbon atoms.

In some embodiments, the natural amino acid is lysine.

In one embodiment, the thiol compound comprises a thiol group and at least one additional functional group capable of forming covalent or non-covalent bonds in the saccharide conjugate or lignin conjugate. In another embodiment, the at least one additional functional group is selected from the group consisting of thiol, amino, hydroxyl, and carboxyl.

In one embodiment, the thiol compound comprises at least two carbon atoms. In one embodiment, the thiol compound is cysteine, a compound having at least two carbon atoms comprising a thiol group and at least one additional functional group selected from thiol, amino, hydroxyl, and carboxyl, or a salt thereof.

In some embodiments, the thiol compound comprises from about 2 to about 12, from about 2 to about 10, from about 2 to about 8, or from about 2 to about 6 carbon atoms.

In some embodiments, the ratio of lignin to second linker molecule is from about 10:1 to about 1:5, from about 10:1 to about 1:4, from about 10:1 to about 1:2, from about 10:1 to about 1:1, from about 9:1 to about 1:2, from about 9:1 to about 1:1, from about 8:1 to about 1:2, from about 8:1 to about 1:1, from about 7:1 to about 1:2, from about 7:1 to about 1:1, from about 6:1 to about 1:2, from about 6:1 to about 1:1, from about 5:1 to about to about 2:1, from about 5:1 to about 1:1 by dry weight.

In some embodiments, the ratio of lignin to second linker molecule (c) is from about 10:1 to about 1:1 by dry weight. In some embodiments, the ratio of lignin to second linker molecule (c) is about 3:1 by dry weight.

In some embodiments, the ratio of second linker molecule (a) to lignin is from about 4:1 to about 1:2 by dry weight. In some embodiments, the ratio of second linker molecule (a) to lignin is about 3.7:1 to about 0.74:1. In some embodiments, the ratio of second linker molecule (a) to lignin is about 1.2:1.

In some embodiments, the ratio of second linker molecule (a) to polyphenol is about 1:1 to about 5:1 by dry weight. In some embodiments, the ratio of second linker molecule (a) to polyphenol is from about 1.9:1 to about 4.7:1. In some embodiments, the ratio of second linker molecule (a) to polyphenol is from about 2.3:1 to about 3.9:1. In some embodiments, the ratio of second linker molecule (a) to polyphenol is about 3.9:1.

In some embodiments, the ratio of second linker molecule (a) to lignin to polyphenol to second component is about 2-5:2-5:1:3-7 by dry weight. In some embodiments, the ratio of second linker molecule (a) to lignin to polyphenol to second component is about 1.9-4.7:2-5:1:2.8-6.7 or 3.6:3:1:5.6 by dry weight.

In one embodiment, the second component, framework element (a), first linker molecule, or second linker molecule comprises a polypeptide or oligopeptide. In some embodiments, the polypeptide or oligopeptide comprises at least about 2, 3, 5, 10, 20, 50, 100, 150, 200, 250, 300, 350, 400, 450, 500, or 550 amino acids. In some embodiments, the polypeptide or oligopeptide comprises from about 2 to about 550, from about 3 to about 550, from about 5 to about 550, from about 10 to about 550, from about 2 to about 500, from about 3 to about 500, from about 5 to about 500, or from about 10 to about 500 amino acids.

In some embodiments, the polypeptide or oligopeptide is a natural or synthetic polypeptide or oligopeptide. In some embodiments, the natural polypeptide or oligopeptide is a plant or animal polypeptide or oligopeptide.

In some embodiments, the polypeptide or oligopeptide is a meat, fish, dairy, egg, or plant polypeptide or oligopeptide.

In some embodiments, the polypeptide or oligopeptide is a zein, soy, keratin, gluten, casein, or whey polypeptide or oligopeptide, or any combination of any two or more thereof.

In some embodiments, the polypeptide is a protein. In some embodiments, the polypeptide is a meat, fish, dairy, egg, or plant protein. In some embodiments, the protein is a zein or soy protein.

In some embodiments, the framework element (a) is a zein protein. In some embodiment, the second component is a soy protein.

In some embodiments, the second linker molecule (a) is a zein protein.

In some embodiments, the protein is denatured.

In one embodiment, the adhesive further comprises a protein denaturing agent.

In some embodiments, the denaturing agent is selected from the group consisting of organic solvents, salts, ureas and salts thereof, guanidines and salts thereof, thiols and salts thereof, surfactants, dispersants, and any combination of any two or more thereof.

In one embodiment, the organic solvent is a polar protic or aprotic solvent. In one embodiment, the organic solvent is an alcohol. In one embodiment, alcohol is glycerol. In one embodiment, the salts are selected from metal salts, inorganic non-metal salts, and salts of organic compounds. In one embodiment, the salt has high solubility in water.

In one embodiment, the metal salt is an alkali or alkaline earth metal salt. In one embodiment, the metal salt is a sodium salt. In one embodiment, the sodium salt is sodium chloride, sodium sulfite, sodium sulfate, sodium acteate, sodium formate, or sodium bisulfite. In certain embodiments, the adhesive composition comprises a denaturing agent comprising sodium sulfite.

In one embodiment, the inorganic non-metal salt or salt of an organic compound is selected from amine, ammonium, organic nitrogen, and phosphate salts.

In some embodiments, the polyamine is selected from organic compounds comprising two or more amine groups. In some embodiments, the polyamine is selected from aliphatic or aromatic compounds comprising two or more amine groups. In some embodiments, the polyamine comprises at least two carbon atoms. In some embodiments, the polyamine comprises from about 2 to about 100, from about 2 to about 150, from about 2 to about 100, from about 2 to about 75, from about 2 to about 50, from about 2 to about 25 carbon atoms.

In some embodiments, the polyamine is a polymer comprising monomers of an aliphatic or aromatic compound comprising two or more amine groups. In some embodiments the monomers comprise at least 2 carbon atoms. In some embodiments, the monomers comprise from about 2 to about 20, from about 2 to about 15, from about 2 to about 12, from about 2 to about 10, from about 2 to about 8, or from about 2 to about 6 carbon atoms.

In some embodiments, the polyamine comprises a linear or substantially linear chain of carbon atoms. In some embodiments, the polyamine comprises a linear or substantially linear aliphatic chain comprising from about 2 to about 12, from about 2 to about 10, from about 2 to about 8, or from about 2 to about 6 carbon atoms.

In some embodiments, the aldehyde or carboxylic acid compound comprises from about 1 to about 12, from about 1 to about 10, from about 1 to about 8, from about 1 to about 6, from about 2 to about 12, from about 2 to about 10, from about 2 to about 8, from about 2 to about 6 carbon atoms. In some embodiments, the aldehyde is formaldehyde or an aliphatic or aromatic compound comprising from 2 to 12 carbon atoms and two or more aldehyde groups.

In some embodiments, the carboxylic acid compound, or salt, ester, anhydride or halide thereof comprises or is capable of providing on conjugation at least one additional functional group capable of forming covalent or non-covalent bonds in the saccharide conjugate or lignin conjugate.

In some embodiments, the carboxylic acid compound, or salt, ester, anhydride or halide thereof is selected from formic acid, carbonic acid, or salt, ester, anhydride or halide thereof; an aliphatic or aromatic compound comprising a carboxylic acid group, or a salt, ester, or anhydride thereof and having at least two carbon atoms, for example from 2 to 12, 2 to 10, 2 to 8, or 2 to 6 carbon atoms.

In some embodiments, the aliphatic or aromatic compound is a cyclic ester or cyclic anhydride having at least 3 carbon atoms, preferably at least 4 carbon atoms, for example from 3 to 8, 4 to 8, 4 to 7, or 4 to 6 carbon atoms; or an aliphatic or aromatic compound comprising a carboxylic acid group, or a salt, acyclic ester, or acyclic anhydride thereof having at least two carbon atoms, for example from 2 to 12, 2 to 10, 2 to 8, or 2 to 6 carbon atoms and further comprising at least one additional functional group selected from thiol, amino, hydroxyl, and carboxyl.

In some embodiments, the aliphatic or aromatic compound is a polycarboxylic acid, for example a dicarboxylic acid, having at least two carbon atoms for example from 2 to 12, 2 to 10, 2 to 8, or 2 to 6 carbon atoms, or a salt thereof; or a cyclic anhydride having at least 4 carbon atoms, preferably at least 5 carbon atoms, for example, from 4 to 8, 4 to 7, or 4 to 6 carbon atoms.

In some embodiments the halide is an acid chloride, acid bromide, or acid iodide, preferably an acid chloride or acid bromide, more preferably an acid chloride.

In some embodiments, the carboxylic acid compound, or salt, ester, anhydride or halide thereof is a carboxylic acid compound, or salt, ester, or anhydride thereof.

In some embodiments, the second linker molecule comprises two or more, for example three, four, five, or more, linker molecules selected from (c) and aldehyde compound contiguous to each other.

In some embodiments, the second linker comprises both an amine compound and an aldehyde. In some embodiments, second linker molecule comprises an amine compound and an aldehyde compound contiguous thereto.

In one embodiment, the framework element (b) comprises a polysaccharide or oligosaccharide. In some embodiments, the polysaccharide or oligosaccharide comprises at least about 2, 3, 5, 10, 20, 50, 100, 200, 300, 400, 500, 550, 600, 650, 700, 750, 800, 850, 900, 950, 1000, 1250, 1500, or 2000 monosaccharide units. In some embodiments, the polysaccharide or oligosaccharide comprises from about 2 to about 2000, from about 3 to about 2000, from about 5 to about 2000, from about 10 to about 2000, from about 2 to about 1500, from about 3 to about 1500, from about 5 to about 1500, from about 10 to about 1500 monosaccharide units.

In some embodiments, the polysaccharide or oligosaccharide has a molecular weight of less than 50,000 Daltons. In some embodiments, the molecular weight is from about 1,500 to about 50,000 Daltons.

In some embodiments, the framework element (b) comprises a polysaccharide.

In some embodiments, the polysaccharide is a natural polysaccharide or modified polysaccharide. In some embodiments, the natural polysaccharide is an animal, plant, or microbial polysaccharide.

In some embodiments, the polysaccharide is selected from the group consisting of starches, oxidised starches, hydrolysed starches, gums, celluloses, hemicelluloses, dextrins, dextrans, glycogens, chitosans, chitins, aminopolysaccharides, glycoproteins, and any combination of any two or more thereof.

In some embodiments, the monosaccharide is glucosamine.

In some embodiments, the framework element (c) comprises a lignin.

In some embodiments, the lignin has a molecular weight from about 2,000 to about 300,000, from about 5,000 to about 300,000, from about 2,000 to about 100,000, or from about 5,000 to about 100,000 Daltons.

In some embodiments, the lignin is a chemically modified lignin.

In some embodiments, the framework element (c) comprises a lignan.

In one embodiment, the polyphenol comprises a tannin, or a tannic acid. In another embodiment, the polyphenol comprises a tannin.

In one embodiment, the polyphenol further comprises lignin. In one embodiment, the polyphenol comprises a tannin-lignin complex.

In some embodiments, the polyphenol comprises a tannin or a mixture of a tannin and a lignin. In some embodiments, the polyphenol comprises a tannin or a tannin-lignin complex.

In some embodiments, the adhesive composition comprises at least about 1, 2, 3, 5, 6, 7, 8, 9, 10, 11, 12, 13, 14, 15, 20, 25, 30, 35, 40, 45, 50, 55, 60, 65, 70, 75, 80, 85, 90, 95% by weight macromolecular complex. In some embodiments, the solids content is from about 5 to about 99%, from about 10 to about 99%, from about 5 to about 95%, or from about 10 to about 95%.

In some embodiments, the adhesive composition has a viscosity of at least about 5 cP, at least about 10 cP, at least about 25 cP, at least about 50 cP, at least 75 about cP, at least about 100 cP, or at least about 125 cP. In some embodiments, the viscosity is less than about 100,000 cP, less than about 75,000 cP, less than about 50,000 cP, less than about 25,000 cP, less than about 10,000 cP, less than about 7,500 cP, or less than about 5,000 cP. In some embodiments, the viscosity is from about 5 to about 100,000 cP, from about 10 to about 75,000 cP, from about 10 to about 50,000 cP, from about 25 to about 25,000 cP, from about 25 to about 10,000 cP, from about 50 cP to about 10,000 cP, from about 75 to about 10,000 cP, from about 100 to about 10,000, from about 25 to about 7,500 cP, from about 50 to about 7,500 cP, from about 100 to about 7,500 cP, from about 100 to about 7,500 cP, from about 25 to about 5,000 cP, from about 50 to about 5,000 cP, from about 75 to about 5,000 cP, or from about 100 to about 5,000 cP.

In some embodiments, the first component is covalently or non-covalently bound to the second component.

In some embodiments, the framework element is covalently or non-covalently bound to the polyphenol; and the polyphenol is covalently or non-covalently bound to the second component.

In some embodiments, the polyphenol is bound by covalent or non-covalent bonding between oxygen containing functional groups of the polyphenol and the framework element and covalent or non-covalent bonding between oxygen containing functional groups of the polyphenol the second component.

In some embodiments, the oxygen containing functional groups of the polyphenol comprise hydroxyl, carboxylic acid, ester, ether, ketone, or aldehyde groups. In some embodiments, the oxygen containing functional groups comprise hydroxyl, carboxylic acid, ester and ether groups.

In some embodiments:
(a) the first component is covalently or non-covalently bound to the second component,
(b) the polyphenol is covalently or non-covalently bound to the framework element,
(c) the polyphenol is covalently or non-covalently bound to the second component,
(d) the polysaccharide, oligosaccharide, monosaccharide, or any combination of any two or more thereof of the saccharide conjugate is covalently or non-covalently bound to the first linker molecule, or
(e) the lignin of the lignin conjugate is covalently or non-covalently bound to the second linker molecule, or
(f) any combination of any two or more thereof.

In one embodiment, the composition comprises one or more additives selected from the group consisting of organic solvents, surfactants, dispersants, viscosity modifiers, and hydrophobizing agents.

In some embodiments, the one or more additives provide water resistance to or enhance the water resistance of a lignocellulosic substrate comprising the adhesive. In some embodiments, the one or more additives are selected from metal salts, for example soluble and insoluble metal salts including but not limited to zinc, magnesium, aluminium, and calcium salts, such as carbonates (e.g. calcium carbonate), which provide water resistance to or enhance to water resistance of the a lignocellulosic substrate comprising the adhesive.

In one embodiment, the additive is a polyol, a fatty acid or an ester or a salt thereof, an inorganic polyhydroxylated non-metal compound or an ester or a salt thereof, or a metal ion. In one embodiment, the polyol comprises at least two carbon atoms. In another embodiment, the polyol comprises from 2 to 10 carbon atoms. In certain embodiments, the polyol is glycerol.

In one embodiment, the inorganic polyhydroxylated non-metal compound or an ester or a salt thereof or metal ion are as defined in any of the embodiments described herein in relation to the first or second linker molecule.

In some embodiments, the adhesive has or provides:
(a) an internal bond strength of at least about 0.45 MPa when tested according to AS/NZS: 4266;
(b) a density of at least about 600 kg/m³ when evaluated according to AS/NZS: 4266;
(c) an average maximum load value of at least about 1250 N when tested according to ASTM D906-98;
(d) a tensile stress of at least about 2 MPa when tested according to ASTM D906-98;
(e) a glue line bond rating of satisfactory on chisel testing when tested according to AS/NZS 2098.2:2006 B;
(f) formaldehyde emissions of less than 0.5 mg/L when tested according to AS/NZS 4266:2004 following 7 days conditioning; or
(g) any combination of any two or more thereof.

In some embodiments, the internal bond strength is at least about 0.5, about 0.55, about 0.6, or about 0.65 MPa.

In some embodiments, the density is at least about 650, about 700, or about 750 kg/m³.

In some embodiments, the formaldehyde emissions are less that about 0.45, about 0.4, about 0.35, about 0.3 mg/L, about 0.25 mg/L, about 0.2 mg/L, about 0.15 mg/L, or about 0.1 mg/L.

In some embodiments, the pH of the composition is from about 3 to about 9, for example from about 4 to about 6.

In some embodiments, the viscosity of the composition remains within a predetermined range within which the composition is suitable for application to a substrate for at least about 3, 5, 7, 8, 9, 10, 11, 12, 13, 14, 21, or 28 days.

In some embodiments, the adhesive comprises, consists of, or consists essentially of a macromolecular complex comprising:
(A) a first component comprising
  (i) a framework element selected from
    (a) a polypeptide,
    (b) a polysaccharide or a saccharide conjugate comprising a polysaccharide and a first linker molecule, and
    (c) a lignin or a lignin conjugate comprising a lignin and a second linker molecule; and
  (ii) a polyphenol comprising a tannin; and
(B) a second component comprising a polypeptide.

In another aspect, the invention provides an adhesive precursor composition comprising, consisting of, or consisting essentially of a first component comprising:
(i) a framework element selected from
  (a) a polypeptide, oligopeptide, amino acid, polyamine, or any combination of any two or more thereof,
  (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule, and
  (c) a lignin, a lignan or a lignin conjugate comprising a lignin and a second linker molecule; and
(ii) a polyphenol comprising a tannin, a tannic acid, a flavonoid, a poly-resorcinol or any combination of any two or more thereof.

In one embodiment, framework element (a) is a polypeptide, oligopeptide, amino acid, or any combination of any two or more thereof.

In one embodiment, the first component, framework element, and polyphenol are as defined in any of the embodiments described herein.

In some embodiments, the precursor composition comprises a denaturing agent and/or one or more additives, for example, an organic solvent, surfactant, dispersant, viscosity modifier, and/or hydrophobizing agent, as may be present in the adhesive composition.

In one embodiment, the composition is in the form of solid particles or an aqueous solubilisation, solution, dispersion or suspension.

In another aspect, the present invention provides a process for producing an aqueous adhesive composition comprising, consisting of, or consisting essentially of a macromolecular complex, the process comprising:
(1) providing an aqueous composition comprising a first component, the first component comprising:
  (i) a framework element selected from
    (a) a polypeptide, oligopeptide, amino acid, polyamine, or any combination of any two or more thereof,
    (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule,
(c) a lignin, a lignan or a lignin conjugate comprising a lignin and a second linker molecule; and
(ii) a polyphenol comprising a tannin, a tannic acid, a flavonoid, a poly-resorcinol or any combination of any two or more thereof; and
(2) admixing a second component comprising a polypeptide, oligopeptide, amino acid, polyamine, or any combination of any two or more thereof to form a macromolecular complex.

In one embodiment, the first component, framework element, polyphenol, and second component are as defined in any of the embodiments described herein.

In some embodiments, step (1) comprises:
(a) providing an aqueous composition comprising the framework element;
(b) admixing the polyphenol to form the first component.

In one embodiment, the process comprises:
(1)(a) providing an aqueous composition comprising a framework element selected from
    (a) a polypeptide, oligopeptide, amino acid, polyamine, or any combination of any two or more thereof,
    (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule,
    (c) a lignin, a lignan or a lignin conjugate comprising a lignin and a second linker molecule; and
(1)(b) admixing a polyphenol comprising a tannin, a tannic acid, a flavonoid, a poly-resorcinol or any combination of any two or more thereof to form a first component; and
(2) admixing a second component comprising a polypeptide, oligopeptide, amino acid, polyamine, or any combination of any two or more thereof with the first component to form a macromolecular complex.

In another embodiment, the process comprises:
(1)(a) providing an aqueous composition comprising a framework element selected from
    (d) a polypeptide,
    (e) a polysaccharide or a saccharide conjugate comprising a polysaccharide and a first linker molecule,
    (f) a lignin or a lignin conjugate comprising a lignin and a second linker molecule; and
(1)(b) admixing a polyphenol comprising a tannin to form a first component; and
(2) admixing a second component comprising a polypeptide with the first component to form a macromolecular complex.

In some embodiments, step (1)(a) comprises:
(i) providing an aqueous composition comprising (a) a polysaccharide, oligosaccharide, monosaccharide, or any combination of any two or more thereof or (b) a first linker molecule; and
(ii) admixing the other of (a) or (b) to form a saccharide conjugate; or (i) providing an aqueous composition comprising (a) a lignin or (b) a second linker molecule; and
(ii) admixing the other of (a) or (b) to form a lignin conjugate.

In some embodiments, the first linker molecule (b) or the second linker molecule (b) comprises two or more linker molecules, and step (1)(a) comprises admixing the two or more linker molecules with (a) in any order.

In some embodiments, the first linker molecule or the second linker molecule comprises two or more linker molecules, and step (1)(a) comprises admixing one of the two or more linker molecules with (a) to conjugate the linker molecule and (a), and then subsequently admixing one or more other linker molecules to form a saccharide conjugate or lignin conjugate comprising a first linker molecule or second linker molecule comprising two or more linker molecules contiguous to each other.

In some embodiments, the providing of step (1), (1)(a), or (1)(a)(i), or any combination of any two or more thereof comprises solubilising, dissolving, dispersing, or suspending the first component, the framework element, the polysaccharide, oligosaccharide, monosaccharide, or any combination of any two or more thereof, the first linker molecule, the lignin, or the second linker molecule in an aqueous solution.

In some embodiments, the aqueous composition of step (1), (1)(a), or (1)(a)(i), or any combination of any two or more thereof is a solubilisation, solution, dispersion, or suspension.

In some embodiments, the solubilisation, solution, dispersion, or suspension is stable to precipitation of the framework element, the polysaccharide, oligosaccharide, monosaccharide, or any combination of any two or more thereof, the first linker molecule, the lignin, or the second linker molecule for a period of at least 2, 3, 5, 10, 15, 20, 30, or 60 minutes.

In some embodiments, the solubilising, dissolving, dispersing, or suspending is carried out at alkaline pH or elevated temperature or both.

In some embodiments, the admixing of step (2), (1)(b), or (1)(a)(ii), or any combination of any two or more thereof is carried out at alkaline pH or elevated temperature or both.

In some embodiments, pH is at least about 8, at least about 9, or at least about 10.

In some embodiments, the pH is from about 8 to about 13, from about 8 to about 12, from about 8 to about 11, from about 8 to about 10, from about 8 to about 9, from 9 to about 13, from about 9 to about 12, from about 9 to about 11, from about 9 to about 10, from about 10 to about 13, from about 10 to about 12, from about 10 to about 11, from about 11 to about 13, from about 11 to about 12.

In some embodiments, the temperature is at least about 50, at least about 55, at least about 60, at least about 65, or at least about 70° C.

In some embodiments, the temperature is from about 50 to about 95° C., from about 50 to about 90, from about 50 to about 80, from about 50 to about 70, from about 50 to about 60, from about 60 to about 95, from about 60 to about 90, from about 60 to about 80, from about 60 to about 70, from about 70 to about 95, from about 70 to about 90, from about 70 to about 80, from about 80 to about 95, or from about 80 to about 90° C.

In some embodiments, the pH or temperature or both of the aqueous composition is maintained during the admixing.

In some embodiments, the admixing of step (2), (1)(b), or (1)(a)(ii), or any combination of any two or more thereof comprises solubilising, dissolving, suspending or dispersing the second component, the polyphenol, the polysaccharide, oligosaccharide, monosaccharide, or any combination of any two or more thereof, the first linker, the lignin, or the second linker.

In some embodiments, the admixing of step (2), (1)(b), or (1)(a)(ii), or any combination of any two or more thereof further comprises adjusting the conditions (i.e. one or more conditions of the reaction) to form the macromolecular complex, first component, saccharide conjugate, or lignin conjugate.

In some embodiments, adjusting the conditions (i.e. one or more conditions of the reaction) comprises reducing the pH or temperature or both.

In some embodiments, the pH is reduced to a pH of at least about 8, at least about 9, or at least about 10.

In some embodiments, the temperature reduced to a temperature from about 50 to about 80° C.

In some embodiments, the admixing of step (2), (1)(b), or (1)(a)(ii), or any combination of any two or more thereof further comprises admixing further second component, further polyphenol, further polysaccharide, oligosaccharide, monosaccharide, or any combination of any two or more thereof, further first linker, further lignin, or further second linker.

In some embodiments, the admixing of step (2), (1)(b), or (1)(a)(ii), or any combination of any two or more thereof comprises:
(A) admixing the second component, the polyphenol, the polysaccharide, oligosaccharide, monosaccharide, or any combination of any two or more thereof, the first linker, the lignin, or the second linker;
(B) adjusting the reaction conditions to form the macromolecular complex, a first component, a saccharide conjugate, or a lignin conjugate; and
(C) admixing further second component, further polyphenol, further polysaccharide, oligosaccharide, monosaccharide, or any combination of any two or more thereof, further first linker, further lignin, or further second linker to form further macromolecular complex, further first component, further saccharide conjugate, or further lignin conjugate.

The further macromolecular complex, further first component, further saccharide conjugate, or further lignin conjugate formed in step (C) may be the same or different to the macromolecular complex, first component, saccharide conjugate, or lignin conjugate formed in step (B).

In some embodiments, the further macromolecular complex, further first component, further saccharide conjugate, or further lignin conjugate formed in step (C) is formed from the macromolecular complex, first component, saccharide conjugate, or lignin conjugate formed in step (B).

In some embodiments, the admixing of step (2), (1)(b), or (1)(a)(ii), or any combination of any two or more thereof is carried out under conditions that inhibit or prevent coagulation in the reaction mixture.

In one embodiment, the composition comprises one or more additives selected that enhance solubilisation, dissolution, suspension, or dispersion of any one or more of the first component, the second component, the framework element, the first linker, the second linker, the polysaccharide, oligosaccharide, monosaccharide, or any combination of any two or more thereof, the lignin, or any combination of any two or more thereof.

In some embodiments, the additive is from the group consisting of organic solvents, surfactants, and dispersants.

In some embodiments, step (2) is carried out at a pH of from about 8 to about 10. In exemplary embodiments, step (2) is carried out at a pH of about 9.

In some embodiments, the polypeptide, oligopeptide, amino acid, polyamine, or any combination of any two or more thereof in step (2) is admixed under conditions that inhibit or prevent coagulation in the reaction mixture.

In some embodiments, the conditions are alkaline. In some embodiments, the pH is about 9. In some embodiments, the temperature is from about 50 to about 80° C. In some embodiments, the temperature is about 70° C.

In some embodiments, the polypeptide, oligopeptide, amino acid, polypeptide, or any combination of any two or more is admixed in combination with or after admixing one or more additives that enhance its solubility. In some embodiments, the additive is a protein denaturing agent.

In some embodiments, step (1)(b) is carried out at a pH from about 9 to about 13. In some embodiments, the pH is from about 9 to about 12. In some embodiments, the pH is from about 9 to 11.5. In some embodiments, the pH is from about 10 to about 11. In some embodiments the pH is about 11. In some embodiments, the pH is about 9.

In some embodiments, step (1)(b) is carried out at a temperature from about 70 to about 95° C. In some embodiments, the temperature is about 90° C. In some embodiments, temperature is from about 50 to about 80° C. In some embodiments, the temperature is about 70° C.

In some embodiments, the conditions are adjusted to form the macromolecular conjugate. In some embodiments, the pH is reduced. In some embodiments, the pH is reduced to about 9. In some embodiments, the temperature is reduced. In some embodiments, the temperature is reduced to from about 50 to about 80° C. In some embodiments, the temperature is reduced to about 70° C.

In some embodiments, step (1)(b) comprises:
(A) admixing the polyphenol;
(B) adjusting the reaction conditions to form a first component; and
(C) admixing further polyphenol to form the first component.

In some embodiments, the first component formed in step (C) is formed from the first component in step (B), for example by adding pendant tannin units.

In some embodiments, the further polyphenol is admixed under conditions that inhibit or prevent coagulation in the reaction mixture.

In some embodiments, the conditions are alkaline. In some embodiments, the pH is about 9. In some embodiments, the temperature is from about 50 to about 80° C. In some embodiments, the temperature is about 70° C.

In some embodiments, step (1)(a) comprises solubilising, dissolving, dispersing, or suspending a framework element in an aqueous solution.

In some embodiments, the framework element is solubilised, dissolved, dispersed, or suspended under alkaline conditions. In some embodiments, the pH is from about 9 to about 13. In some embodiments, the pH is about 11.

In some embodiments, the framework element is solubilised, dissolved, dispersed, or suspended at an elevated temperature. In some embodiments, the framework element is solubilised, dissolved, dispersed, or suspended at a temperature from about 70 to about 95° C. In some embodiments, the temperature is about 90° C.

In one embodiment, step (1)(a) comprises solubilising, dissolving, dispersing, or suspending a framework element (a) in an aqueous solution under alkaline conditions. In one embodiment, the pH is from about 10 to about 12. In another embodiment, the pH is about 10.5.

In one embodiment, step (1)(a) comprises solubilising, dissolving, dispersing, or suspending a framework element (a) in an aqueous solution at an elevated temperature. In one embodiment, the temperature is from about 50 to about 90° C. In another embodiment, the temperature is about 70° C.

In one embodiment, step (1)(a)(ii) comprises admixing the first linker molecule under alkaline conditions or at elevated temperature or both to form the saccharide conjugate. In one embodiment, the pH is about 9.

In one embodiment, the first linker is an inorganic polyhydroxylated non-metal compound or an ester or a salt thereof. In one embodiment, the polyhydroxylated non-metal compound is boric acid or an ester or a salt thereof.

In one embodiment, step (1)(a)(ii) comprises admixing the second linker molecule under alkaline conditions or at elevated temperature or both, and adjusting the conditions to form the lignin conjugate.

In one embodiment, adjusting the conditions to form the lignin conjugate comprises reducing the pH. In one embodiment, the pH is reduced to about 9.

In one embodiment, adjusting the conditions to form the lignin conjugate comprises reducing the temperature. In one embodiment, the temperature reduced to a temperature from about 50 to about 80° C. In another embodiment, the temperature is reduced to about 70° C.

In one embodiment, the step (1)(a)(ii) comprises admixing the second linker molecule and an enzyme under conditions effective for enzymatically conjugating the second linker molecule to form the lignin conjugate.

In some embodiments, step (1)(a)(ii) comprises admixing an amine compound and an aldehyde to form the lignin conjugate.

In some embodiments, step (1)(a)(ii) comprises admixing a carboxylic acid compound or a salt, ester, anhydride or halide thereof and an inorganic polyhydroxylated non-metal compound or ester or salt thereof to form the lignin conjugate.

In some embodiments, step (1)(a)(ii) comprises admixing a carboxylic acid compound or a salt, ester, anhydride or halide thereof and the lignin to conjugate the carboxylic acid compound or a salt, ester, anhydride or halide thereof to the lignin, and subsequently admixing a polyhydroxylated non-metal compound, preferably boric acid or an ester or salt thereof, to form a lignin conjugate comprising an inorganic polyhydroxylated non-metal compound or ester or salt thereof and a carboxylic acid compound or a salt, ester, anhydride or halide thereof contiguous thereto.

In one embodiment, the second linker molecule is an amine compound or a salt thereof. In one embodiment, the amine compound is lysine.

In one embodiment, step (1)(a)(ii) comprises admixing the lignin under alkaline conditions or at elevated temperature or both, and adjusting the conditions to form the lignin conjugate.

In one embodiment, the second linker is a polysaccharide, oligosaccharide, monosaccharide, or any combination of any two or more thereof. In one embodiment, the polysaccharide, oligosaccharide, monosaccharide, or any combination of any two or more thereof is zein.

In one embodiment, adjusting the conditions comprises reducing the pH. In one embodiment, the pH is reduced to about 9.

In one embodiment, adjusting the conditions comprises reducing the temperature. In one embodiment, the temperature reduced to from about 50 to about 80° C. In another embodiment, the temperature is reduced to about 70° C.

In one embodiment, the lignin is admixed under alkaline conditions or at elevated temperature or both. In one embodiment, the pH is about 12.5.

In some embodiments, the second component is admixed in combination with or after admixing one or more additives that enhances the solubilisation, dissolution, dispersion, or suspension of the second component.

In some embodiments, the additive is a protein denaturing agent as defined in any of the embodiments described herein.

In some embodiments, the additive is selected from sodium salts, for example sodium sulfite, and glycerol, or any combination of any two or more thereof. In certain embodiments, the additive is sodium sulfite.

In some embodiments, step (2) comprises admixing the second component and a protein denaturing agent with the aqueous composition comprising the first component.

In some embodiments, the protein denaturing agent is admixed with the aqueous composition comprising the first component prior to or contemporaneously with the second component.

In some embodiments, step (2) comprises admixing a composition comprising the second component and a protein denaturing agent with the aqueous composition comprising the first component. In some embodiments, the composition comprising the second component and a protein denaturing agent is an aqueous solubilisation, solution, dispersion, or suspension.

In some embodiments, the denaturing agent is as defined in any of the embodiments described above.

In some embodiments, step (2) further comprises admixing one or more viscosity modifying agents.

In some embodiments, step (2) further comprises admixing one or more dispersion agents.

In some embodiments, step (2) comprises admixing the second component at an elevated first temperature, optionally maintaining the first temperature for a first period of time, adjusting the temperature to a second temperature, and maintaining the second temperature for a second period of time.

In some embodiments, step (2) comprises admixing the second component at an elevated first temperature, optionally maintaining the first temperature for a first period of time to at least partially solubilise, dissolve, or suspend or disperse the second component, adjusting the temperature to a second temperature, and maintaining the second temperature to further solubilise, dissolve, or suspend or disperse the second component.

In some embodiments, the second temperature is lower than the first temperature.

In some embodiments, the optional step of maintaining the first temperature for a first period of time is carried out.

In some embodiments, the method comprises after step (2), a step (3) comprising adjusting the pH of the composition, preferably to a pH within from about 3 to about 9, for example from about 4 to about 6.

In one embodiment, the ratio of the framework element to polyphenol, framework element (a) to polyphenol, framework element (a) to polyphenol to second component, framework element (b) to polyphenol, framework element (c) to polyphenol, second component to polyphenol, polyphenol to first linker molecule, polyphenol to second linker molecule, lignin to second linker molecule, lignin to second linker molecule (a), lignin to second linker molecule (c), or second linker molecule (c) to lignin to polyphenol, or any combination of any two or more thereof is as defined in any of the embodiments described herein.

In another aspect, the present invention provides an aqueous adhesive composition produced by a process according to the present invention.

In another aspect, the present invention provides a process for producing an adhesive precursor composition comprising, consisting of, or consisting essentially of a first component, the process comprising:

(1) providing an aqueous composition comprising a framework element selected from
   (a) a polypeptide, oligopeptide, amino acid, polyamine, or any combination of any two or more thereof,
   (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule,
   (c) a lignin, a lignan or a lignin conjugate comprising a lignin and a second linker molecule; and
(2) admixing the framework element with a polyphenol comprising a tannin, a tannic acid, a flavonoid, a polyresorcinol or any combination of any two or more thereof to provide a first component.

In some embodiments, framework element (a) is a polypeptide, oligopeptide, amino acid, or any combination of any two or more thereof.

In some embodiments, the framework element and polyphenol are as defined in any of the embodiments described herein.

In another aspect, the present invention provides an adhesive precursor composition comprising, consisting of, or consisting essentially of a first component produced by a process according to the present invention.

In another aspect, the present invention provides a lignocellulosic substrate comprising a cured or curable adhesive composition of the present invention.

In some embodiments, the substrate is a lignocellulosic composite. In some embodiments, the composite comprises lignocellulosic fibres, particles, flakes, strands, chips, or sheets. In some embodiments, the lignocellulosic fibres, particles, flakes, strands, chips, or sheets are wood fibres, particles, flakes, strands, chips, or sheets.

In some embodiments, the loading of the adhesive is from about 5% to about 50% by weight.

In some embodiments, the composite has:
(a) an internal bond strength of at least about 0.45 MPa when tested according to AS/NZS: 4266;
(b) a density of at least about 600 kg/m³ when evaluated according to AS/NZS:4266;
(c) an average maximum load value of at least about 1250 N when tested according to ASTM D906-98;
(d) a tensile stress of at least about 2 MPa when tested according to ASTM D906-98;
(e) a glue line bond rating of satisfactory on chisel testing when tested according to AS/NZS 2098.2:2006 B;
(f) formaldehyde emissions of less than 0.5 mg/L when tested according to AS/NZS 4266:2004 following 7 days conditioning; or
(g) any combination of any two or more thereof, for example three, four, five, or more.

In some embodiments, the internal bond strength is at least about 0.5, about 0.55, about 0.6, or about 0.65 MPa.

In some embodiments, the density is at least about 650, about 700, or about 750 kg/m³.

In some embodiments, the formaldehyde emissions are less that about 0.45, about 0.4, about 0.35, or about 0.3 mg/L.

In some embodiments, the composite is a particleboard, oriented strand board, waferboard, fibreboard, parallel strand lumber, laminated strand lumber, plywood, laminated veneer lumber, finger jointed lumber, scrimber board, paperboard, linerboard, or other engineered wood product or engineered wood product board.

In some embodiments, the composite is a particleboard, oriented strand board, waferboard, fibreboard, parallel strand lumber, laminated strand lumber, plywood, laminated veneer lumber, or finger jointed lumber. In some embodiments, the composite is a particleboard, fibreboard, or plywood.

In another aspect, the present invention provides a process for producing a lignocellulosic composite, the process comprising applying the adhesive composition of the present invention to lignocellulosic fibres, particles, flakes, strands, chips, or sheets; and forming a composite from the fibres, particles, flakes, strands, chips or sheets.

In some embodiments, forming the composite comprises applying heat or pressure or both.

In some embodiments, the heat applied is of a temperature from about 120 to about 250° C. In some embodiments, the temperature is from about 150 to about 220° C.

In some embodiments, the pressure is from about 5 kN to about 35 kN.

In another aspect, the present invention provides a process for bonding a first substrate to a second substrate, the process comprising:
(a) applying the adhesive composition of the present invention to the first substrate or the first substrate and the second substrate; and
(b) contacting the second substrate or the adhesive applied to the second substrate with the adhesive applied to the first substrate to bond the first substrate to the second substrate.

In another aspect the present invention provides an adhesive for lignocellulosic substrates and particularly for the manufacture of lignocellulosic composites and for joining wood, which comprises the reaction product of:
   (a) a first component itself being the reaction product of
      (i) a framework element; and
      (ii) a bio-derived polyphenolic such as tannin, a tannin rich material or a combination of polyphenolic lignin and tannin;
   and
   (b) a second component comprising a protein or a protein rich substrate or amino acid;
wherein the framework element is comprised of one or more of zein, a zein-rich corn or maize material or residue, wheat gluten, soy protein, soy flour or soy meal, any other protein, lignin, a lignin derivative such as a lignosulfonate, a ligninamine compound conjugate, a zein-lignin conjugate, starch, amino sugars including chitosan, chitin, or sugar-protein conjugates.

Preferably the protein or protein rich substrate is soy protein, soy flour or soy meal or any other bio-derived protein or high protein feedstock including but not limited to keratin, gluten and casein.

Preferably the framework element is subjected to alkaline solubilisation and the tannin is added to the framework element in solution and the pH is adjusted to approximately pH 9 to promote the formation of the first component.

Preferably the protein or protein rich substrate is added to the first component still in solution while maintaining the pH at or about pH9.

Preferably the protein rich substrate is one or more of soy protein, soy flour, wheat gluten or other proteinaceous material.

Preferably a denaturing agent is added with the protein or protein rich substrate.

The denaturing agent may consist of glycerol, sodium salts such as sodium chloride or sodium sulphite or sodium bisulphite (hydrogen sulphite), urea, thiols, surfactants and dispersants or any combination of any two or more thereof.

Preferably the framework element component is initially solubilised at a pH of 9 to 11.5 and at temperatures of 50-90° C.

Preferably when solubilising zein a pH of about pH 11 or greater is used and preferably a pH greater that pH 10.2 for lignin.

Preferably after solubilising the framework element the tannin is added, dispersed and the pH reduced to 9 to induce formation of the first component.

Preferably when the bio-derived polyphenolic is a combination of lignin and tannin, the lignin and tannin are added sequentially.

Optionally boric acid is added when impure feedstocks are used to promote binding of starch and carbohydrate and other impurities.

Optionally, an additional viscosity modifier is added.

Optionally a wax or wax based additive is also added.

Preferably the additional viscosity modifier is selected from sodium sulphite or sodium bi-sulphite. It will be apparent to a person skilled in the art that a range of other viscosity modifiers could be used.

Preferably zein rich corn or maize material or residue means a material or residue having at least 30% zein by dry weight.

Preferably the protein content of zein or zein-rich ingredient is at least 50% and more preferably at least 60% by weight.

In some embodiments of the invention the framework element is first formulated by the addition of lignin to zein, or an amino acid such as lysine to lignin.

In one embodiments of the invention wherein lignin is used, prior to the addition of the tannin, an amino acid is added.

Preferably that amino acid has 2 or more amine groups.

Preferable the amino acid is lysine.

Where a lignin-lysine combination is used conjugation of the lignin and lysine can be achieved in more than one way. For example, it can be achieved via pH adjustment and re-suspension. It can also be achieved by covalent bond grafting promoted by an enzyme such as laccase.

In one embodiment of the invention glycerol or sodium salts are added to the first component in solution with or prior to the addition of the protein or protein rich substrate. Such additives may assist in soy protein dissolution and have an effect on the final formulation viscosity.

In another aspect the present invention provides a process for the manufacture of an adhesive or resin comprising:
solubilising a framework element;
adding and dispersing a bio-derived polyphenolic such as tannin, a tannin rich material or a combination of polyphenolic lignin and tannin under conditions that prevent the framework element from coagulating before the tannin is dispersed;
altering the conditions to induce formation of a first component from the framework element and the bio-derived polyphenolic;
optionally adding more bio-derived polyphenolic; and
adding a second component comprising a protein or protein rich material or amino acid under conditions and/or with additives that promote the solubilisation and denaturisation of the protein or protein rich material or amino acid without inducing coagulation or precipitation or damaging the intermediate conjugate.

In another aspect the present invention provides use of the adhesive of the present invention in an adhesive blend, for instance with another resin such as a UF, phenolic, melamine, polyamine, or isocyanate, or other amino resin wherein the adhesive not only provides its own adhesive effect but also works as a formaldehyde scavenger reducing the emissions of formaldehyde while the lignocellulosic composite is in synthesis or use.

In another aspect the present invention provides an adhesive blend comprising an adhesive composition of the present invention and one or more additional adhesives.

In another aspect the present invention provides an adhesive blend comprising an adhesive precursor composition of the present invention and one or more additional adhesives.

In another aspect the present invention provides a process for producing an adhesive blend comprising admixing an adhesive composition of the present invention and one or more additional adhesives.

In another aspect the present invention provides a process for producing an adhesive blend comprising admixing an adhesive precursor composition of the present invention and one or more additional adhesives.

In some embodiments, the one or more additional in the aspects above adhesives comprise UF, phenolic, melamine, polyamine, or isocyanate, or another amino resin.

In a further aspect the present invention provides, use of the adhesive of the present invention in conjunction with or in a blend with other soy based adhesives that use isocyanate, epichlorohydrin or polyamidoamine. In some embodiments, the use of the present adhesive minimises the requirement of petrochemical cross-linkers.

In a further aspect the present invention provides a lignocellulosic material-adhesive composite, such as mdf panels, particleboard, plywood and similar products incorporating a lignocellulosic material and the adhesive system as herein described.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

As used herein the term "and/or" means "and" or "or", or both.

As used herein "(s)" following a noun means the plural and/or singular forms of the noun.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

Although the present invention is broadly as defined above, those persons skilled in the art will appreciate that the invention is not limited thereto and that the invention also includes embodiments of which the following description gives examples.

DETAILED DESCRIPTION OF THE INVENTION

The adhesive composition of the present invention comprises a macromolecular complex comprising a first component and a second component associated with each other. The components may be associated with each other in the macromolecular complex by covalent bonds or non-covalent bonding interactions, for example, ionic bonding, hydrogen bonding, van der Walls forces, n-stacking interactions, or hydrophobic interactions.

The first component comprises a framework element and an associated a polyphenol. As for the first component and second component in the macromolecular complex, the framework element and polyphenol of the first component may be associated by covalent or non-covalent bonding interactions.

The term "complex" and related terms such as "complexes" and the like are used herein to designate an association of two or more molecules, including macromolecules, whether by chemical attraction or physical attraction. For example, an association of a first component and a second component, or an association of a framework element and a polyphenol. The complexes described herein are therefore not limited to coordination complexes comprising for example a metal or metal ion coordinated by one or more ligands.

The macromolecular complex comprises a polypeptide, oligopeptide, amino acid, polyamine, or any combination of any two or more thereof. In some embodiments, the polypeptide or oligopeptide is a zein, soy, keratin, gluten, casein, or whey polypeptide or oligopeptide, or any combination of any two or more thereof.

The polypeptide, oligopeptide, amino acid, or polyamine used may be obtained from any suitable source. In some embodiments, the polypeptide, oligopeptide, amino acid, or polyamine is isolated or purified polypeptide, oligopeptide, amino acid, or polyamine.

The polypeptide may be a protein, for example, a meat, fish, dairy, egg, or plant protein. In some embodiments, the protein is a zein or soy protein.

Polypeptides include natural and synthetic proteins, for example, structural proteins, enzymes, and binding proteins.

Non-limiting examples of proteins include milk, whey, casein, egg, egg white, egg yolk, meat, beef, lamb, fish, shellfish, silk, vegetable, legume, alfalfa, clover, pea, bean, kidney bean, soybean, lentil, lupin, mesquite, carob, nut, peanut, rye, cereal, whole wheat, rice, hemp, wheat gluten, fungal, algal protein, and any combination of any two or more thereof. Any such protein may be unhydrolysed, partially hydrolysed or completely hydrolysed.

The polypeptide or oligopeptide may comprise one or more saccharides. In some embodiments, the polypeptide is a glycoprotein.

Suitable amino acids include natural and unnatural amino acids. As used herein an "unnatural amino acid" refers to any amino acid, modified amino acid, or amino acid analogue other than the following twenty genetically encoded α-amino acids: alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine, and valine. Unnatural amino acids include, but are not limited to, N-substituted α-amino acids; α,α-disubstituted amino acids, including cyclic quaternary amino acids; D-amino acids; β-amino acids, including $β^2$- and $β^3$-amino acids and $β^{2,2}$, $β^{2,3}$-, $β^{3,3}$-disubstituted amino acids, including cyclic variants; 3- to 9-membered ring proline analogues; γ-amino acids; and homo amino acids.

In some embodiments, the amino acid is a natural amino acid.

Polyamines are compounds characterised by presence of two or more amine groups. Examples include alkanes with 2 or more carbons per chain, such as 1,2-diaminoethane and 1,6-hexanediamine and compounds possessing ring structures such as 1,4 cyclohexanediamine and 1,3-phenyldiamine.

Useful polyamines include linear or predominantly linear polyamines comprising 3, 4 or 5 or more amine groups.

Polyamines include monomeric compounds comprising two or more amine groups and also polymers comprising such monomers.

In other embodiments, the framework element comprises a polysaccharide, oligosaccharide, monosaccharide or any combination of any two or more thereof.

The polysaccharide, oligosaccharide, or monosaccharide may be obtained from any suitable source. In some embodiments, the polysaccharide, oligosaccharide, or monosaccharide is isolated or purified polysaccharide, oligosaccharide, or monosaccharide.

The polysaccharide may be a natural polysaccharide or modified polysaccharide. Natural polysaccharides include animal, plant, or microbial polysaccharides.

As used herein, the term "polysaccharide" refers to polymers comprising a backbone consisting mainly (for example, at least about 80, 85, or 90%) of monosaccharide repeating units and/or modified monosaccharide repeating units.

In some embodiments, the polysaccharide is selected from the group consisting of starches, oxidised starches, hydrolysed starches, gums, celluloses, hemicelluloses, dextrins, dextrans, glycogens, chitosans, chitins, aminopolysaccharides, glycoproteins, and any combination of any two or more thereof. In some embodiments, the polysaccharide comprises one or more reducing sugars.

Non-limiting examples of polysaccharides include starches, modified starches, amylopectin, modified amylopectin, amylose, modified amylose, chitosan, chitin, guar gum, modified guar gum, locust bean gum, tara gum, konjac gum, konjac flour, fenugreek gum, mesquite gum, aloe mannans, cellulose, modified cellulose such as carboxyalkylated cellulose and carboxymethyl cellulose, oxidized polysaccharides, sulfated polysaccharides, cationic polysaccharides, pectin, arabic gum, karaya gum, xanthan, kappa, iota or lambda carrageenans, agar-agar and alginates.

Polysaccharide starches include natural starches, chemically modified starches, and mixtures of one or more natural and/or chemically modified starches. Natural starches include maize, corn, waxy maize, potato, cassava, tapioca, wheat starch, rice, waxy rice, pea, sago, oat, barley, rye, amaranth, and sweet potato starches. Chemically modified starches include, for example, carboxymethyl starch, hydroxyethyl starch, hydroxypropyl starch, acetate starch, sulfamate starch, phosphate starch, nitrogen modified starch, and the like, for example, chitosan and chitin.

Modified polysaccharides include polysaccharides modified, for example, by etherification, esterification, oxidation, acid hydrolysis, dextrinization, crosslinking, pregelatinization, or enzyme treatment (e.g. with alpha-amylase, beta-amylase, pullulanase, isoamylase, or glucoamylase).

Non-limiting examples of modified polysaccharides include esters, such as the acetate and the half-esters of dicarboxylic acids; ethers, such as hydroxyethyl and hydroxypropyl starches and starches reacted with hydrophobic cationic epoxides; starches oxidized with hypochlorite; starches reacted with cross-linking agents such as boric acid, phosphorous oxychloride, epichlorohydrin or phosphate derivatives prepared by reaction with sodium or potassium orthophosphate or tripolyphosphate. These and other conventional modifications of starch are well known in the art.

Modified polysaccharides comprise a monosaccharide backbone randomly substituted with one or more modifying groups.

Modifying groups include groups that mask or protect functional groups, for example hydroxyl groups as ethers and esters, and groups that introduce additional functional groups, for example cationic, anionic, amphoteric, non-ionic, and crosslinking groups, such as carboxylic acid, carboxylate, amino, and amido groups.

The modifying groups may alter the chemical and/physical properties of the polysaccharide. For example, a modifying group may increase hydrophobicity, reduce hydrophilicity, or increase ability to complex or otherwise associate with the polyphenol and/or other components of the macromolecular complex.

Modifications are not limited to those that provide properties that are beneficial in the context of the invention, but can include modifications that have a neutral or possibly detrimental effect, for example on processing parameters with respect to the process by which the adhesive is prepared or the immediate or long term properties of the adhesive.

For example, a modified polysaccharide in which a small percentage of the hydroxyl groups present are masked, for example as acetyl or methoxy groups that are detrimental in that they block bonding or complexation sites, is still likely to be useful in the invention, as modifying only a small percentage of the function groups of the polysaccharide is likely to have a minimal sum effect on the macromolecule and so is unlikely to render the modified polysaccharide incompatible with the formulation process or to significantly diminish the final bond strength of the adhesive in most instances.

Conversely, modified polysaccharides with groups that are beneficial in some embodiments, for instance groups that may improve bonding or complexing strength, such as carboxymethylation, carboxylation and hydroxyalkalation, may in particular applications and/or at higher degrees of substitution, for example, result in adhesives that are susceptible to moisture and could lead to moisture ingress and degradation of adhesive properties in engineered wood product comprising such adhesives over time.

In some embodiments, the framework element comprises a saccharide conjugate comprising a polysaccharide, oligosaccharide, or monosaccharide, and a first linker molecule conjugated covalently or non-covalently thereto. Without wishing to be bound by theory, it is believed that in macromolecular complex the first linker molecule acts as a linker (or moiety) through which the polysaccharide, oligosaccharide, or monosaccharide and the polyphenol may be associated.

The saccharide conjugate may comprise a plurality of first linker molecules, which may be the same or different.

The saccharide conjugate may be formed or obtained by, or is obtainable by, conjugating a polysaccharide, oligosaccharide, or monosaccharide and a first linker molecule. A wide range of linkers may be suitable for conjugation.

The first linker molecule may comprise two or more linker molecules. In such embodiments, the saccharide conjugate may be formed or obtained by, or is obtainable by, conjugating the polysaccharide, oligosaccharide, or monosaccharide and the two or more linker molecules simultaneously, or separately or sequentially in any order.

In some embodiments the first linker molecule comprises two or more linker molecules contiguous to each other, which may be the same or different. Conjugates comprising such first linker molecules may be prepared by conjugating the two or more linker molecules to the polysaccharide, oligosaccharide, or monosaccharide separately or sequentially.

In some embodiments, the second linker molecule capable of forming covalent bonds and/or non-covalent bonding interactions with the polyphenol and/or other components of the macromolecular complex. A saccharide conjugate may have an increased ability to form such bonds and/or bonding interactions compared the polysaccharide, oligosaccharide, or monosaccharide from which it is formed.

In one embodiment, the first linker molecule may be an inorganic polyhydroxylated non-metal compound or an ester or salt thereof, such as boric acid. The boric acid may be conjugated covalently to the polysaccharide, oligosaccharide, or monosaccharide by exchanging the hydroxyl groups present in the boric acid molecule with oxygen atoms from hydroxyl groups of the polysaccharide, oligosaccharide, or monosaccharide. In such embodiments, the boric acid may be present in the conjugate in the form of a boron ester of the polysaccharide, oligosaccharide, or monosaccharide.

Thus, it will be appreciated that the conjugation of a linker molecule (for example a first linker molecule or a second linker molecule, or any of the two or more linker molecules in a first linker molecule or a second linker molecule comprising two or more linker molecules) by one or more covalent bonds may change or modify the structure of the linker molecule.

In another embodiment, the first linker molecule is a metal ion. Saccharide conjugates comprising a metal ion as a linker molecule may be formed by treating the polysaccharide, oligosaccharide, or monosaccharide with a metal salt comprising the metal ion (i.e. the metal ion is provided in the form of suitable salt). The metal ion may form a metal coordination complex with one or more oxygen atoms from hydroxyl groups present in the polysaccharide, oligosaccharide, or monosaccharide, preferably a chelation complex with two or more oxygen atoms from hydroxyl groups of the polysaccharide, oligosaccharide, or monosaccharide.

In some embodiments, the framework element comprises a lignin, a lignan or a lignin conjugate comprising a lignin and a second linker molecule.

The lignin may be isolated or purified lignin. Lignin may be obtained from various industrial processes.

Lignins are a heterogeneous group of polyphenolic compounds derived from the secondary cell walls of plants and usually from wood. Lignin in wood serves to cross-link polysaccharides in the cell wall and thus confer mechanical strength to the cell wall and to the plant itself as well as playing a role in the conduct of water via vascular tissues.

Lignin comprises a variety of functional groups, for example, hydroxyl, methoxy, carbonyl and carboxyl groups.

Phenolic hydroxy groups can be the most reactive. The number and range of functional groups make an enormous number of modifications of lignin possible, without removing its ability to conjugate with the polyphenol and second component in the macromolecular complex and without negating its structural and bonding role in the adhesive.

Lignin is a complex, amorphous, three-dimensional polymer having a structure based on phenylpropane. In the natural unprocessed form, the molecular structure of lignin varies according to the source and is so complex and varied that its molecular structure has never been completely described.

Lignin is primarily composed of monolignols, a subgroup of phenylpropanoids with single propanoid side chain and phenyl hydroxyl groups.

There are three common monolignols that make up almost all lignin found in nature—p-coumaryl alcohol, coniferyl alcohol, and sinapyl alcohol (Scheme 1). These monomers are biosynthesized in plants via the shikimic acid pathway.

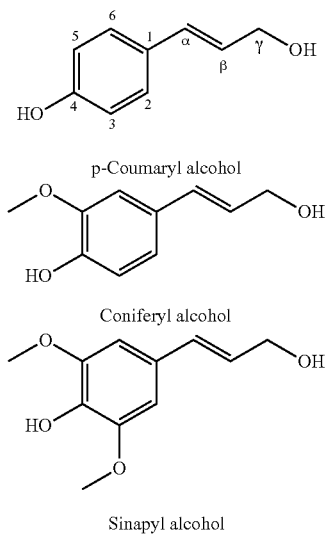

Scheme 1.

p-Coumaryl alcohol

Coniferyl alcohol

Sinapyl alcohol

The ratios of the various monomers depend on the species. p-Coumaryl alcohol is a component of grass and forage-type lignin, but is rare in wood. Coniferyl alcohol is the predominant lignin monomer found in softwoods and both coniferyl and sinapyl alcohols are the major building blocks of hardwood lignin.

A variety of industrial isolation methods have been used for extraction of the lignin from source material. The lignins produced upon isolation include lignin sulfonates, Kraft lignins, soda lignins, organosolve lignins, steam explosion lignins, softwood lignin, hardwood lignin, cellulosic grasses lignins, corn stover lignins, and other lignins, all of which may be modified to produce modified lignins.

Lignins may be modified, for example, in the context of the present invention to improve structural properties, stability, etc. or to increase solubility, etc. Modified lignins are well known in the art.

Non-limiting examples of lignins and modified lignins include sulfinated and sulfonated lignin, lignin modified by hydroxymethylation, epoxidation, denitirication, acylation, or hydroxylation, diethanolamine modified lignin, enzymatically modified lignin, Laccase modified lignin, Kraft lignin, urea-modified lignin, lignosulfonates, Alcell lignins, alkali Granit lignins, reflux lignins, lignin polyols (e.g. via propylene oxide modification), lignin modified by the addition of moieties such as antimicrobial compounds (e.g. paraben, terpenols etc.), lignophenol, amino derivatives of lignin, lignins comprising complexed metal ions, and the like, for example, demethylated lignin.

Native lignins are known to include carboxyl groups. Lignin may be modified to introduce further carboxyl groups by oxidation (e.g. using sodium chlorite). Carboxyl modified lignins are known and are commercially available.

A wide range of modified lignins are useful in the present invention. Suitable lignins and modified lignins are capable of associating with one or more other components of the first component and/or macromolecular complex to form the first component and/or macromolecular complex. Modification that blocks all or the vast majority of complexation sites on a lignin (such as may occur if a lignin is fully acetylated) may affect the ability of such lignins to form the first component and/or macromolecular complex.

Modified lignins comprise a lignin backbone randomly substituted with one or more modifying groups. In some embodiments, phenolic hydroxyl groups of the lignin backbone are substituted with modifying groups.

The lignin backbone includes the carbon skeleton of the lignin polymer which may be derived from the carbons in the lignin monomer units. The lignin backbone further includes the ether linkages between the carbons of adjacent monomer units, which may link the monomer units together in the polymer structure.

Modifying groups include groups that mask or protect functional groups, for example hydroxyl groups as ethers and esters, and groups that introduce additional functional groups, for example cationic, anionic, amphoteric, non-ionic, and crosslinking groups, such as carboxylic acid, carboxylate, amino, and amido groups.

The modifying groups may alter the chemical and/physical properties of the lignin. For example, a modifying group may increase hydrophobicity, reduce hydrophilicity, or increase ability to complex or otherwise associate with the polyphenol and/or other components of the macromolecular complex.

In some embodiments, the lignin comprises a single monolignol as a lignin subunit. In some embodiments, the lignin subunit comprises from about 1 to about 20, from about 2 to about 20, or from about 5 to about 20 monolignol monomers. In some embodiments, the lignin comprises from about 1 to about 20, from about 2 to about 20, or from about 5 to about 20 monolignol monomers.

Lignans are plant polyphenolics derived from similar structural units to lignin. Lignans have structures in which two phenylpropanoid molecules having the C6-C3 skeleton are dimerized. Those with an 8,8' linkage are the most prevalent class of lignans.

They can be found in different parts (roots, leafs, stem, seeds, fruits). In many sources (seeds, fruits), lignans are found as glycosidic conjugates associated with fiber component of plants. Examples of plant lignans include but are not limited to (+)-pinoresinol, (+)-sesamin, (+)-sesaminol, (+)-sesamolin and (+)-sesamolinol contained in sesame (*Sesamum indicum*); (+)-pinoresinol, (−)-arctigenin and (−)-matairesinol contained in forsythia (*Forsythia intermedia*); (−)-pinoresinol and (−)-lariciresinol contained in *Daphne tangutica*; (+)-secoisolariciresinol contained in linum (*Linum usitatissimum*), etc.

The lignin conjugate comprises a lignin and a second linker molecule covalently or non-covalently conjugated thereto. Without wishing to be bound by theory, it is believed that in macromolecular complex the second linker molecule acts as a linker (or moiety) through which the lignin and the polyphenol may be associated.

The lignin conjugate may comprise a plurality of second linker molecules, which may be the same or different.

The conjugate may be formed or obtained by, or is obtainable by, conjugating a lignin and a second linker molecule. A wide range of linkers may be suitable for conjugation.

In some embodiments, the second linker molecule capable of forming covalent bonds and/or non-covalent bonding interactions with the polyphenol and/or other components of the macromolecular complex. A lignin conjugate may have an increased ability to form such bonds and/or bonding interactions compared the lignin from which it is formed.

In one embodiment, the second linker molecule may be a polypeptide, such as a zein protein. The zein protein is conjugated covalently or non-covalently by one or more functional groups present in zein protein to the lignin.

In another embodiment, the second linker molecule may be an amine compound, such as the amino acid lysine. The lysine may be covalently grafted to the lignin, for example, enzymatically or non-enzymatically as described herein.

In another embodiment, the second linker molecule is an aldehyde, for example, formaldehyde or glyoxal. Nucleophilic functional groups in the lignin may react with the aldehyde carbonyl groups to covalently conjugate the aldehyde to the lignin, for example, as an acetal or hemiacetal.

The second linker molecule may comprise two or more linker molecules. In such embodiments, the lignin conjugate may be formed or obtained by, or is obtainable by, conjugating the lignin and the two or more linker molecules simultaneously, or separately or sequentially in any order.

In some embodiments the second linker molecule comprises two or more linker molecules contiguous to each other, which may be the same or different. Conjugates comprising such second linker molecules may be prepared by conjugating the two or more linker molecules to the lignin separately or sequentially.

In some embodiments, the second linker molecule comprises an amine compound (a primary or secondary amine) and an aldehyde compound, such as formaldehyde and lysine. Reaction of formaldehyde and an amine compound with a lignin leads to covalent conjugation of the linkers to the lignin via Mannich-type reactions. It will be appreciated that in such embodiments the formaldehyde may be incorporated into the conjugate in the form of a methylene group ($—CH_2—$) bound to the nitrogen atom of the amine group of the amine compound and another nucleophile, possibly from the lignin.

In other embodiments, the second linker molecule comprises a carboxylic acid compound or a salt, ester, anhydride or halide thereof, for example a dicarboxylic acid, and an inorganic polyhydroxylated non-metal compound or an ester or a salt thereof, for example boric acid. In some embodiments, the dicarboxylic acid may be conjugated to the lignin, followed by the boric acid to provide a conjugate in which the dicarboxylic acid and boric acid are contiguous to each other. In such embodiments, the dicarboxylic acid may be covalently conjugated to the lignin by one of the carboxylic acid groups while the other carboxylic acid group is covalently bound to the boric acid molecule.

In some embodiments, the polyphenol of the first component comprises a tannin, a tannic acid, a flavonoid, a poly-resorcinol or any combination of any two or more thereof.

The tannin, tannic acid, flavonoid, or poly-resorcinol may be obtained from any suitable source. In some embodiments, the tannin, tannic acid, flavonoid, or poly-resorcinol is an isolated or purified tannin, tannic acid, flavonoid, or poly-resorcinol.

Tannins are a group of plant polyphenolic compounds present in a wide range of plants including woody trees but also in fruits, leaves and seeds such as grapes, persimmon, berries, cloves, legumes, herbs, tea leaves and cocoa beans. Tannin molecules generally include numerous hydroxyl groups and often also carboxyl groups, and tend to form strong complexes and conjugates with a range of macromolecules.

Tannins include oligomeric polyphenols that occur naturally in a variety of plants. Isolated tannins typically form a heterogeneous mixture of tannin compounds.

Tannin compounds can be subdivided into two groups: condensed tannins, also known as proanthocyanidins and hydrolysable tannins. Tannin oligomers typically occur as dimers, trimers, tetramers, pentamers, hexamers, heptamers, octamers, nonamers, or decamers. Oligomers with greater than ten monomeric segments can also be isolated, such as oligomers that include up to 50 units.

Tannin polymers and oligomers are primarily comprised of the following base units: gallic acid, flavanols, and phloroglucinol. Which base unit(s) are present and their ratios are largely dependent on which plant source the tannin is taken from.

Hydrolysable tannins include gallic acid and ellagic acid esters of polyol core moieties, such as sugars. Proanthocyanidins are polymers of flavanols (e.g. flavan-3-ols).

Tannins include tannic acid, proanthrocyandins, flavanoids, gallic acid esters, catechins, etc.

Tannins may be modified, for example, in the context of the present invention to improve structural properties, stability, etc. or to increase solubility, etc. Modified tannins are well known in the art. Tannins may be modified, for example, as a result of their extraction process or the primary processing of the material from which the tannin is derived.

Modified tannins comprise a tannin backbone randomly substituted with one or more modifying groups. In some embodiments, phenolic hydroxyl groups of the tannin backbone are substituted with modifying groups.

Modifying groups include groups that mask or protect functional groups, for example hydroxyl groups as ethers and esters, and groups that introduce additional functional groups, for example cationic, anionic, amphoteric, nonionic, and crosslinking groups, such as carboxylic acid, carboxylate, amino, and amido groups.

Examples of tannins and modified tannins include but are not limited to sulfited tannin, lignin-tannin complexes, tannates (e.g. salts or esters of tannic acid), tannin salts, etherified tannin, alkylated (e.g. methylated) tannins, tannin esters (e.g. acetylated tannins), tannin metal complexes (e.g. copper tannates), amine modified tannins, and the like, for example cationic or anionic tannins, and hydroxypropylated tannin. A wide range of modified tannins are useful in the present invention. Suitable tannins and modified tannins are capable of associating with one or more other components of the first component and/or macromolecular complex to form the first component and/or macromolecular complex. Modification that blocks all or the vast majority of complexation sites on a tannin, for example acetylation of substantially all of the hydroxyl groups of a tannin, may affect the ability of such tannins to form the first component and/or macromolecular complex.

For tannins to act as protein binders/cross-linkers they generally must be of a certain size and have sufficient binding sites. Generally, tannins are very large so this is not an issue. In some embodiments, tannin subunits may also be large enough and have enough binding sites to be useful in the invention.

In some embodiments, the tannin comprises 4 or more phenyl groups and 10 or more hydroxyl groups. In some embodiments, the tannin is a tannin subunit or modified tannin comprising 4 or more phenyl groups and 10 or more hydroxyl groups.

Flavonoids, including polyflavonoids, are a well known class of plant secondary metabolites which are ubiquitous in leaves, stems and bark of plants and trees. This broad class of compounds commonly referred as tannins include hydrolysable and condensed tannins which are distinguished by their polyphenolic compositions of either gallic acid or catechin-base monomeric units.

Poly-resorcinols are a class of polyphenolics typically extracted from marine sources such as seaweeds. Poly-resorcinols are structurally closely related to phloroglucinolic based condensed tannins.

In order to provide the required functionality, such as coupling, cross-linking, durability and moisture tolerance, for an adhesive system a combination of multiple components is required.

The macromolecular complex in the adhesive composition of the present invention comprises such a combination of components.

The various components may be combined in a specific order to form the macromolecular complex.

Those skilled in the art will appreciate that in preparing the macromolecular complex (or the first component, saccharide conjugate or lignin conjugate) that the degree of incorporation of any given component in the macromolecular complex (or the first component, saccharide conjugate or lignin conjugate) may be less than 100%. In some embodiments, the degree of incorporation is from about 10% to about 99%, from about 10% to about 95%, from about 10% to about 90%, from about 10% to about 85%, or from about 10% to about 80% by dry weight of starting material (actual component) provided.

Formation of the macromolecular complex, first component, saccharide conjugate or lignin conjugate may be determined by any suitable method, for example by nuclear magnetic resonance spectroscopy (NMR) or infrared spectroscopy as described herein. Formation may also be determined by precipitation or coagulation under conditions that the starting materials would be suitably soluble, dispersed or suspended.

In some embodiments, the adhesive composition of the present invention may be made from combining a protein or lignin (or other macromolecule that can serve a similar purpose, for example a polysaccharide) with a tannin into a first component (or in the context of the adhesive an intermediate that will be a co-polymer in the cured adhesive) and subsequently combining the first component with a second component comprising a protein or protein rich substrate. On curing, the first component and the protein of the second component cross-link to form a thermoset or coldset resin or adhesive.

When combined with a lignocellulosic material such as wood fibre or veneer, the adhesive components upon curing also crosslink with the lignocellulosic material to form a composite material. The adhesive may be suitable for use in a range of engineered wood product composite materials. Better adhesive properties may be obtained in certain embodiments when a denaturing agent is added with the protein or protein rich substrate. Denaturing agents such as glycerol, sodium salts such as sodium chloride or sodium sulphite or sodium bisulphite (hydrogen sulphite), urea, thiols, surfactants and dispersants serve to open the protein molecules, by destroying their quaternary, tertiary, and/or secondary structure, and may also help to solubilise them.

The adhesive of the present invention may be provided by stepwise construction of components, in particular formation of a first component (by adding a framework component (e.g. a protein, lignin, starch or modified lignin) to a polyphenolic component (e.g. a tannin)) followed by addition of a second component (e.g. protein) to form the adhesive. Temperature, pH and the order of addition can be controlled in order to dissolve or disperse a component or conjugate in solution, to prevent or promote conjugation or complexation of the components present at relevant times, and to achieve ordered conjugation.

Manufacture of the adhesive first requires formation of a first component. The first component may be formed by, for example, conjugating tannin to a protein. In other embodiments of the invention other macromolecules or modified or complexed macromolecules may be used in place of the protein. Amino acid complexed lignin is one example. Others may include starch, protein-lignin combination and others.

The formation of the first component, e.g. conjugation of a tannin with a protein or lignin complex, can be controlled through control of aqueous pH, temperature, component ratio and addition order. The specific ranges of temperature, time and pH used to control solution, dissolution, conjugation promotion etc. may be important for first component formulation, adhesive formation, adhesive properties, and composite properties. It should be noted that to a certain degree these variables are interdependent and subject to the specific components used in a specific formulation. For example, zein and soy can both be used as the framework element but zein requires substantially more alkaline conditions to solubilise. A person skilled in the art will recognise appropriate conditions that may be used to, for example, solubilise the various components, maintain solublisation (e.g. prevent coagulation), and control (e.g. promote or inhibit) their conjugation.

The order of addition and first component formation may also be important. For example, a soy-tannin:soy adhesive made via first forming a soy-tannin complex before adding more soy results in a far superior adhesive than if tannin was simply added to a quantity of soy protein equal to the sum of the 2 soy components.

Formation of the first component can be demonstrated in a number of ways. For instance a zein-tannin complex can be precipitated from solution under conditions that in the absence of complexation would see the tannin remaining in solution. NMR analysis shows broadening and intensity changes of peaks associated with tannin hydroxyl carbons (ca. 155 ppm) and peptide amido-carbonyls (ca. 175 ppm) indicating the presence of a multitude of chemical interactions and complexation through hydrogen bonding of phenolic hydroxyls and amino groups. In some embodiments of the invention, infrared spectroscopy shows peak changes indicating ammonium formation from hydroxyl-amino bonding.

Similar effects are apparent when the first component is formed by adding tannin to lysine modified lignin, and with other formulation combinations.

In one embodiment, the process is to solubilise the framework element (e.g. zein) under suitable conditions for such solubilisation, then add and disperse the tannin under conditions that avoid framework element coagulation before the tannin is well dispersed, and then modify the conditions (e.g. reduce the pH or temperature) to facilitate conjugate formation.

Optionally more tannin may be added to add pendant tannin units. The second component (e.g. a protein such as soy flour) is then added under conditions and/or with additives that promote soy dissolution. Then the adhesive is cooled.

The second component, for example soy protein, is typically added at an elevated temperature and the composition maintained at elevated temperature for a period of time to sufficient to solubilise, dissolve, disperse, or suspend the second component and form the macromolecular complex. The temperature and period of time required can vary depending on various factors, such as the purity ingredient containing the second component. For ingredients of low purity with respect to the amount of second component in the ingredient, longer heating times and/or higher temperatures may be required to solubilise, dissolve, disperse, or suspend the second component compared to ingredients of higher purity.

In some embodiments, for example where the ingredient that provides the second component comprises components other than the second component, the second component may be added to the composition at an elevated first temperature and the first temperature maintained for a period of time to promote or facilitate solubilisation, dissolution, dispersion, or suspension of at least part of the second component, after which the temperature may be adjusted to a second temperature, typically lower than the first temperature, and the second temperature maintained for a period of time to promote or facilitate solubilisation, dissolution, dispersion, or suspension of further second component. Macromolecular complex may be form throughout the heating process.

Heating after addition of the second component for an extended period of time can, in certain embodiments, reduce the rate at which the viscosity of the adhesive composition increases over time (on storage, before application to a substrate). This increases the period of time for which the adhesive composition, on storage, remains at a viscosity suitable for application to a suitable substrate.

In the case of a zein-tannin:soy protein adhesive, the zein component is typically solubilised first then conjugated with the tannin. The zein-tannin conjugate is then combined with the soy protein. To solubilise zein in an aqueous solution generally requires a temperature of 70-90° C. and alkaline conditions in the range of about pH 11. Tannin can then be added and the pH reduced to about 9 and the temperature lowered to 50-70° C. to promote polyphenolic-protein conjugation. More tannin can be added. Additives such as glycerol or sodium salts may be added to promote soy protein dissolution. The soy protein is added and dispersed into the adhesive formulation maintaining a pH of 9 and a temperature of 70° C. The final formulation is then cooled to ambient temperature.

Upon or after cooling, the pH may be further adjusted by the addition of an acid (for example, formic acid) to a pH typically in the range of 3-9. The pH of the final formulation depends on the specific demands of the application for which the adhesive is produced. For instance, plywood production requires an adhesive with a pH at the lower end of this range to impart greater moisture resistance, typically a pH in the range of about 4-6.

On application of the adhesive to lignocellulosic substrates and curing, the components cross-link with each other and the lignocellulosic substrate to form the hardened composite product.

The adhesive compositions described herein may be combined with one or more additional adhesives to provide an adhesive blend. The content of the adhesive compositions described herein in the blend may be determined by the other adhesive(s) present in the blend and the applicant for which the blend is intended.

Zein-Tannin First Components

Delivery of zein in a soluble form followed by combination with a tannin creates a zein-tannin first component. This zein-tannin first component imparts hydrophobicity and serves as a cross-linker for the soy component in zein-tannin:soy adhesives.

In zein-tannin conjugate formation avoiding protein coagulation before all the tannin is added and dispersed in the solution can be achieved by pH manipulation. Adding tannin at about pH 11 prevents protein coagulation. Once the required dosage of tannin is added and dispersed in the solution the pH can be adjusted to about pH 9. The change in pH induces conjugate formation and colloidal dispersion of the zein-tannin first component.

The ratio of zein:tannin is controlled to first avoid agglomeration of zein colloids on pH adjustment. This step can be adapted and applied even when using ingredients (raw materials) with varying degrees of zein content. A further quantity of tannin can be added to further conjugate the zein and create free, non-complexing residual/pendant tannin units available for further protein coordinating on soy protein addition.

Lignin-Tannin First Components

In one embodiment, lignin is first coupled with an amine compound such as lysine and then the pH adjusted to ensure lignin-amine compound conjugation. Tannin is subsequently added.

Lignin phenolic hydroxyl conjugation with amide and amino groups present in proteins, peptide residues and amino acids can modify the lignin to aid conjugation with tannin.

Variations involving enzymatic coupling can also be used, such as using peroxidise enzymes to promote grafting between lignin and amino groups. Tannin is subsequently added.

This first component can be integrated into a lignin-tannin:soy or zein-lignin-tannin:soy adhesive formulation, for example, by the subsequent addition of soy protein as the second component under specified conditions.

Other synthetic methods can also be used to form lignin-tannin first components. For instance lignin-tannin first components can be formed synthetically through addition of formaldehyde, glyoxal or other aldehydes to lignin followed by tannin addition. An amino acid and formaldehyde can also be coupled to lignin in a Mannich reaction with the product then coupled to tannin. However, to avoid formaldehyde chemistry, the methods above provide a simple alternative.

Starch-Tannin First Components

Starch components may be incorporated with tannin through coupling residual aldehyde groups present in the carbohydrate component. To achieve substantially greater conjugation rates borate-mediated coupling can be used. In one embodiment, under alkaline conditions (around pH 9), boric acid is added which leads to coupling of starch hydroxyls and residual tannin phenolic groups. This results in starch-tannin conjugation through the boron centre. A 20:1 tannin:boric acid ratio appears to provide suitable properties and conjugation potential.

Zein:Tannin:Soy Adhesives

Zein can be used in varying purity raw materials, for example pure zein or corn and maize starch processing residues, such as unrefined corn or gluten meal or corn or gluten flour, ground to pass a 1 mm screen (preferably <0.25 mm) and having a purity of at least 50% zein, more preferably 62-100%, with typically 62-70% zein materials being commonly available.

In one embodiment, the zein ingredient (raw material containing zein) is added to water and the pH adjusted between 9 and 13 (preferably 11) and between 70 to 95° C. (preferably 90° C.). Heating is continued until all particulates are deemed solubilised giving a light yellow to brown dispersion within 45-75 minutes (terms such as solution or suspension can be equally applied here).

The initial amount of water used with the zein is typically dictated by final adhesive viscosity requirements.

An initial charge of the tannin ingredient (raw material) is added to the zein dispersion while maintaining pH 11 and 90° C. The amount added can range between 20:1 to 5:1, preferably 10:1 (zein:tannin by ingredient (raw material) weight).

The pH is reduced to pH 9 and temperature reduced to 50-80° C., preferably 70° C.

A second charge of tannin ingredient is added giving a combined ingredient ratio of 7:1 to 3:1 (zein:tannin by ingredient weight), preferably 5:1, and completes the formation of the zein-tannin intermediate.

Glycerol or other additives can be added to ensure soy protein dispersion and favourable formulation properties such as viscosity.

Maintaining pH 9 and 70° C. a soy protein ingredient (raw material) is added. The soy ingredient may have a soy purity of at least 40% soy, preferably 50-100%, with typically 50-55% purity being common in soy flours and soy meals favoured for adhesives manufacture.

The amount of soy can be 5:1 to 10:1, preferably 5:1 (soy:tannin by ingredient weight).

In some embodiments, the soy is dispersed within 15-75 minutes to give the zein-tannin:soy macromolecular complex. The actual length of time required for soy protein dispersion in any given case will be determined by the targeted final adhesive properties (including viscosity).

In some embodiments, the soy is admixed at an elevated temperature of about 70° C. for 30-60 min (e.g. about 45 min), the temperature reduced to about 50° C., and heating continued for an extended period of time, such as 90-120 min (e.g. 120 min), to form the macromolecular complex. Times and temperatures may be varied depending various factors, such the purity of the soy raw material or ingredient used.

Boric acid may be added to the formulation as it is cooled to ambient temperature. The amount of tannin used dictates the quantity of boric acid, typically being 40:1 to 15:1, preferably 20:1 tannin:boric acid by dry weight of the components, which can aid conjugation and binding of residual carbohydrates with tannin.

Zein:Iignin:Tannin:Soy Adhesives

Zein can be used in varying purity, as described above, for example from corn and maize starch processing residues possessing a purity of at least 50% zein, more preferably 62-100%, with typically 62-70% zein materials being commonly available.

In one embodiment, the zein ingredient is added to water and the pH adjusted between 9 and 13 (preferably 11) and between 70 to 95° C. (preferably 90° C.). Heating is continued until all particulates are deemed solubilised giving a light yellow to brown solution dispersion within 45-75 minutes.

The initial amount of water used with the zein is typically dictated by final adhesive viscosity requirements.

Caustic is added to increase alkalinity. The caustic required is typically the amount required to dissolve the following amount of lignin used.

Lignin is then added to the zein solution allowing time for the lignin to become fully solubilised. The lignin added gives a 5:5 to 5:1 ratio (zein:lignin by ingredient weight), for example 5:3.

The solution is then adjusted to pH 9 and a temperature of 50-80° C. causing precipitation of the zein-lignin conjugate.

Tannin ingredient is added giving an ingredient ratio of 2.5:1 to 6:1 (zein:tannin by ingredient weight), preferably 3:1-5:1, for example 3:1, and completes the formation of the lignin conjugate-tannin first component.

Glycerol or other additives can be added to ensure soy protein dispersion and favourable formulation properties such as viscosity.

Maintaining pH 9 and 70° C., a soy protein ingredient is added. The soy ingredient may have a soy purity of at least 40% soy, preferably 50-100%, with typically 50-55% purity being common in soy flours or soy meals favoured for adhesives.

The amount of soy can be 5:1 to 12:1, preferably 10:1 (soy:tannin by ingredient weight).

In some embodiments, the soy is dispersed within 15-75 minutes, for example 45-50 minutes, to give the macromolecular complex. In other embodiments, the soy may be admixed at first temperature and heated at a second lower temperature for an extended period of time to form the macromolecular complex as described above.

Boric acid may be added to the formulation as it is cooled to ambient temperature. The amount of tannin used dictates the quantity of boric acid, typically being 40:1 to 15:1, preferably 20:1 tannin:boric acid by dry weight of the components, which can aid conjugation and binding of residual carbohydrates with tannin.

Lignin:Tannin:Soy Adhesives by Chemical Linkage

In one embodiment, a technical lignin is dissolved in water and the pH adjusted to pH 10-12, preferably at least pH 10.5 with heating between 50 and 90° C.

The initial amount of water used with the lignin is typically dictated by final adhesive viscosity requirements.

An amino acid such as lysine with at least 50% purity is added to the solution in the amount of 5:1 to 1:2, preferably 1:1 (lignin:lysine by ingredient weight).

The pH is reduced to pH 9 and temperature reduced to 50-80° C., preferably 70° C.

The resulting suspension creates the lignin-amino acid conjugate.

Tannin ingredient is added giving an ingredient ratio of 2.5:1 to 6:1 (lignin:tannin by ingredient weight), preferably 3:1-5:1, for example 3:1, and completes the formation of the lignin conjugate-tannin first component.

Glycerol or other additives can be added to ensure soy protein dispersion and favourable formulation properties such as viscosity.

Maintaining pH 9 and 70° C. a soy protein ingredient is added. The soy ingredient will have a soy purity of at least 40% soy, more preferably 50-100%, with typically 50-55% purity being common in soy flours and soy meals favoured for adhesives.

The amount of soy can be 5:1 to 12:1, preferably 10:1 (soy:tannin by ingredient weight).

The soy is dispersed within 15-75 minutes, for example 45-50 minutes, to give the macromolecular complex. In other embodiments, the soy may be admixed at first temperature and heated at a second lower temperature for an extended period of time to form the macromolecular complex as described above.

Boric acid may be added to the formulation as it is cooled to ambient temperature. The amount of tannin used dictates the quantity of boric acid, typically being 40:1 to 15:1, preferably 20:1 tannin:boric acid by dry weight of the components, which can aid conjugation and binding of residual carbohydrates with tannin.

Lignin:Tannin:Soy Adhesives by Enzymatic Coupling

In one embodiment, a technical lignin is dissolved in water and the pH adjusted to pH 10-12, preferably at least pH 10.5 with heating between 40 and 80° C.

Lysine with at least 50% purity is added to the solution in the amount of 5:1 to 1:2, preferably 1:1 (lignin:lysine by ingredient weight).

The pH is reduced to pH 5-7 and temperature reduced to 40-60° C., preferably 50° C.

The resulting suspension is treated with lignin perioxidase enzyme such as laccase with an activity of 40-250 U/g on lignin. The laccase activity determines the length of reaction time between 4 to 20 hours, preferably 6 hours reaction time using 200 U/g.

The lignin is grafted with the amino acid.

Tannin ingredient is added giving a combined ingredient ratio of 2.5:1 to 6:1 (lignin:tannin by ingredient weight), preferably 3:1-5:1, for example 3:1, and completes the formation of the lignin conjugate-tannin first component.

The reaction mixture is heated to 70° C.

The remaining steps are the same as above variation (a).

Glycerol or other additives can be added to ensure soy protein dispersion and favourable formulation properties such as viscosity.

Maintaining pH 9 and 70° C. a soy protein ingredient is added. The soy ingredient will have a soy purity of at least 40% soy, more preferably 50-100%, with typically 50-55% purity being common in soy flours and soy meals favoured for adhesives.

The amount of soy can be 5:1 to 12:1, preferably 10:1 (soy:tannin by ingredient weight).

The soy is dispersed within 15-75 minutes, for example 45-50 minutes, to give the macromolecular complex. In other embodiments, the soy may be admixed at first temperature and heated at a second lower temperature for an extended period of time to form the macromolecular complex as described above.

Boric acid may be added to the formulation as it is cooled to ambient temperature. The amount of tannin used dictates the quantity of boric acid, typically being 40:1 to 15:1, preferably 20:1 tannin:boric acid by dry weight of the components, which can aid conjugation and binding of residual carbohydrates with tannin.

The following non-limiting examples are provided to illustrate the present invention and in no way limit the scope thereof.

EXAMPLES

Example 1. Zein:Tannin:Soy MDF

Avon Gold (corn gluten meal, ca. 70% zein)(100 g) was added to water (450 mL) and then adjusted to pH 11 with 40% sodium hydroxide solution. The reaction mixture was heated to 90° C. for 50 minutes ensuring pH 11 was maintained. After 1 hour a mimosa tannin (10 g) was added and the solution stirred for 10 minutes while adjusting the pH to pH 9 with formic acid solution and reducing the temperature to 70° C. A further charge of tannin (10 g) was added and stirring continued. Glycerol (130 mL) was added followed by addition of soy flour 7B (100 g). Stirring was continued for another 50 minutes and then the solution cooled to ambient temperature. During cooling, boric acid (0.55 g) was added. The final solution was then applied as a fine spray to mechanically blended wood fibre at a rate of 8-10% adhesive content on fibre. The fibre was formed into a mattress and consolidated by hot-pressing at 180° C. to give a 8 mm medium density fibreboard (MDF) with an internal bond strength of 0.45 MPa and 24 hour cold water soak thickness swell of 29%, being a panel that contains no added sizing agent wax.

Example 2. Zein:Tannin:Soy MDF

Avon Gold (80 g) was added to water (360 mL) and then adjusted to pH 11 with 40% sodium hydroxide solution. The reaction mixture was heated to 90° C. for 50 minutes ensuring pH 11 was maintained. After 1 hour a sulfited pine bark tannin (8 g) was added and the solution stirred for 10 minutes while adjusting the pH to pH 9 with formic acid solution and reducing the temperature to 70° C. A further charge of tannin (8 g) was added and stirring continued. Glycerol (130 mL) was added followed by addition of soy flour 7B (ca. 50-52% soy protein)(80 g). Stirring was continued for another 50 minutes and then the solution cooled to ambient temperature. During cooling, boric acid (0.48 g) was added. The final solution was then applied by mechanically blending with wood fibre at a rate of 8-10% adhesive content on fibre. The fibre was formed into a mattress and consolidated by hot-pressing at 210° C. to give a 8 mm medium density fibreboard with an internal bond strength of 0.55 MPa and 24 hour cold water soak thickness swell of 31%.

Example 3. Lignin:Tannin:Soy MDF

A lignosulfonate (30 g) was added to 70° C. water (310 mL) and adjusted to pH 11 with sodium hydroxide. Lysine sulphate (30 g) was added and after dissolving the pH was adjusted to pH 9 with formic acid. Pine bark tannin (10 g) was added and stirring continued. After adding in glycerol (120 mL) soy flour 7B (100 g) was added and stirring continued for 60 minutes. Boric acid (0.50 g) was added and the solution cooled. The brown solution was applied to wood fibre at a rate of 8-10% adhesive content on fibre and mechanically blended. This fibre was hot-pressed at 180° C. to give a 8 mm medium density fibreboard with an internal bond strength of 0.57 MPa and 24 hour cold water soak thickness swell of 21%.

Example 4. Zein:Lignin:Tannin:Soy MDF

Avon Gold (50 g) was added to water (360 mL) and then adjusted to pH 11 with 40% sodium hydroxide solution. The reaction mixture was then heated to 90° C. for 50 minutes ensuring pH 11 was maintained. Caustic (sodium hydroxide) was added to give pH 12.5 and then Kraft lignin (30 g) added. After dissolving the lignin the pH was adjusted to pH 9 with formic acid and mimosa tannin (10 g) added and stirring continued. Glycerol (120 mL) was added followed by addition of soy hydrosylate (ca. 90% soy protein)(55 g) and stirring continued for 60 minutes. Boric acid (0.55 g) was added and the solution then cooled. The brown solution was applied to wood fibre at a rate of 8% adhesive content on fibre and mechanically blended. This fibre was hot-pressed at 180° C. to give a 8 mm medium density fibreboard having an internal bond strength of 0.37 MPa and 24 hour cold water soak thickness swell of 33%.

Example 5. Lignin:Tannin:Soy Plywood Panel

Indulin AT lignin (Kraft lignin) (30 g) was added to 70° C. water (310 mL) and adjusted to pH 11 with sodium hydroxide. Lysine sulphate (30 g) was added and after dissolving the pH was adjusted to pH 9 with formic acid. Sulfited tannin (10 g) was added and stirring continued. After adding in glycerol (120 mL) soy flour 7B (100 g) was added and stirring continued for 60 minutes. Boric acid (0.50 g) was added and the solution cooled. The brown solution was applied to single sides of radiata pine softwood veneer at a rate of 100 g/m². The veneers were laid up to give a 5 ply stack and then cold pressed for 5 minutes. A plywood panel was then formed by hot-pressing at 140° C. The plywood does not delaminate after 16 hours cold water soaking.

Example 6. Zein:Tannin:Soy MDF

Avon Gold, a corn gluten meal, (1.44 kg) was dispersed into water (10.1 kg) and 40% sodium hydroxide (40%, 211 g) added to adjust the solution to pH 11. This reaction mixture was heated to 90° C. for 50 minutes maintaining pH 11. Sulfited pine bark tannin (144 g) was then added and the solution stirred for 10 minutes before adding formic acid (40%, 50 g) and reducing the temperature to 70° C. With the aqueous suspension at pH 9, additional sulfited pine bark tannin (144 g) was added and stirring continued. Glycerol (1.9 kg) was then added followed by the careful addition of soy flour 7B (1.44 kg). Stirring was continued for 50 minutes before cooling the adhesive formulation to ambient temperature. During cooling, boric acid (10 g) was added. The adhesive was applied to wood fibre by mechanically blending at a rate of 10% adhesive content on fibre. The fibre was formed into a mattress, pre-pressed at ambient temperature to 40-50 mm thickness. The pre-press mattress was then consolidated by hot-pressing at 210° C. pressing at a rate of 20 sec/mm (180 sec) to give a 8 mm medium density fibreboard with an average density of 710 kg/m³. Testing to AS/NZS:4266 gave an internal bond strength of 0.55 MPa and an unwaxed MDF panel 24 hour cold water soak thickness swell of 31%.

Example 8. Lignin:Tannin:Soy MDF

Lignosulfonate (30 g) was added to 70° C. water (310 mL) and adjusted to pH 11 with sodium hydroxide. Lysine sulphate (30 g) was added and after dissolving the pH was adjusted to pH 9 with formic acid. Pine bark tannin (10 g) was added and stirring continued. After adding in glycerol (120 mL), soy flour 7B (100 g) was added and stirring continued for 60 minutes. Boric acid (0.50 g) was added and the solution cooled. The resulting adhesive was applied to wood fibre by mechanically blending at a rate of 10% adhesive content on fibre. The fibre was formed into a mattress, pre-pressed at ambient temperature to 50 mm thickness. The pre-press mattress was then consolidated by hot-pressing at 180° C. pressing at a rate of 20 sec/mm (180 sec) to give a 8 mm medium density fibreboard with an average density of 720 kg/m³. Testing to AS/NZS:4266 gave an internal bond strength of 0.57 MPa and an unwaxed MDF panel 24 hour cold water soak thickness swell of 21%.

Example 9. Lignin:Tannin:Soy MDF

Indulin AT lignin (660 g) and lysine sulphate (660 g) were combined in water (7.4 kg) and sodium hydroxide (40%, 586 g) add to achieve a pH>10.5. This solution was then adjusted to pH 7 with formic acid (40%, 470 g). Laccase enzyme (46 g, 55 nkat, 203 U on lignin) was added and the solution stirred for 6 hours at 50° C. After adjustment to pH 9 (with caustic solution—sodium hydroxide), sulfited pine bark tannin (220 g) was added and the solution stirred for 10 mins while heating to 70° C. Glycerol (2.9 kg) was added followed by careful addition of soy flour 7B (2.2 kg) while maintaining 70° C. After 50 minutes boric acid (10 g) was added and the adhesive formulation then cooled to ambient temperature. Application of the adhesive to wood fibre and pressing at 180° C. gave an 8 mm MDF panel with average density of 670 kg/m³. This MDF panel had a measured formaldehyde emission of 0.04 mg/L as determined by the standard Japanese desiccator method according to AS/NZS 4266:2004.

In the above formulation the ratio of lignin:tannin:soy raw materials (i.e. ingredients) is 3:1:10 by weight ingredients.

With this the ratio of the lignin:lysine raw materials is 1:1 by weight. This corresponds to about 1 lysine per 1 lignin unit (i.e. the phenylpropyl unit which comprises the lignin unit)—i.e. a ratio of about 1:1 by dry weight of the components.

Tannin is added on a unitary basis. This gives a ratio of lignin-tannin raw materials of 3:1 by weight.

The ratio of lignin:soy protein raw materials is 3:5 by weight, as the soy flour is ca. 50% protein.

Overall the ratio of 3:1:10 by weight of raw materials corresponds to a ratio of approximately 3:1:5 by weight of the actual components (i.e. the actual amount by dry weight of lignin, tannin, and soy in the respective raw materials).

The adhesives of the current invention are designed to be able to be manufactured from low cost impure raw materials such as maize or corn waste (for zein), and soy flour or soy meal. Only some components of the raw materials may be involved in formation of the macromolecular complex. On occasions additional additives may be needed to inhibit or prevent impurities in the raw materials from adversely affecting the formation or stability of the macromolecular. For instance boric acid can be added to aid in the cross-linking of residual carbohydrate starch molecules.

Example 10. Zein:Tannin:Soy Plywood

Avon Gold (200 g) was added to water (1105 mL) and then adjusted to pH 11 with sodium hydroxide solution (40%, 25.8 g) and heated to 90° C. for 50 minutes. After 1 hour mimosa tannin (20 g) was added and the solution stirred while adjusting the pH to pH 9 with formic acid solution (40%, 5.9 g) and reducing the temperature to 70° C. Additional mimosa tannin (20 g) was added. Glycerol (260 g) and water (130 mL) were added followed by addition of soy flour 7B (200 g). Stirring was continued for another 50 minutes while maintaining pH 9. The adhesive was then cooled to ambient temperature and boric acid (1.6 g) added during cooling. The adhesive was combined with 5% wheat flour by weight and applied to radiata pine softwood veneer at a spread rate of 200 g/m². After a 10 minute open assembly, the veneers were laid up to give a 5 ply stack and then cold pressed for 5 minutes. A plywood panel was then formed by hot-pressing at 160° C. with 14 minutes. Shear testing by tension loading using ASTM D906-98 revealed adhesive strength properties with an average maximum load value of 1527 N and tensile stress of 2.4 MPa.

Example 11. Lignin:Tannin:Soy Plywood

Indulin AT lignin (30 g) was added to 70° C. water (310 mL) and adjusted to pH 11 with sodium hydroxide. Lysine sulphate (30 g) was added and after dissolving the pH was adjusted to pH 9 with formic acid. Sulfited tannin (10 g) was added and stirring continued. After adding in glycerol (120 mL) soy flour 7B (100 g) was added and stirring continued for 60 minutes. Boric acid (0.50 g) was added and the adhesive cooled. The adhesive was applied to single sides of radiata pine softwood veneer (250×250 mm) at a rate of 200 g/m². The veneers were laid up to give a 5 ply stack and then cold pressed at 59 kN for 5. A plywood panel was then formed by hot-pressing at 150° C. for 10 mins at 90 kN. Satisfactory dry glue line bond ratings were achieved on chisel testing to AS/NZS 2098.2:2006 B with wood failures of 63-95% across all gluelines. The plywood does not delaminate after 16 hours cold water soaking.

Example 12. Lignin:Tannin:Soy Plywood

Lignosulfonate (90 g) and lysine sulphate (90 g) were added to 70° C. water (810 mL) and adjusted to pH 11 with sodium hydroxide solution (40%, 89 g). After dissolving the pH was adjusted to pH 9 with formic acid (40%, 85 g) and water (170 mL). Mimosa tannin (30 g) was added and stirring continued. Soy flour 7B (300 g) was added and stirring continued for 60 minutes. Boric acid (1.6 g) was added and the adhesive cooled. The adhesive was combined with 5% wheat flour by weight and applied to radiata pine softwood veneer at a spread rate of 200 g/m². After a 10 minute open assembly, the veneers were laid up to give a 5 ply stack and then cold pressed for 5 minutes. A plywood panel was then formed by hot-pressing at 160° C. with 14 minutes. Satisfactory dry glue line bond ratings were achieved on chisel testing to AS/NZS 2098.2:2006 B. Shear testing by tension loading using ASTM D906-98 revealed adhesive strength properties with an average maximum load value of 1778 N and tensile stress >2.9 MPa.

Example 13. Lignin:Tannin:Soy MDF with Additional Viscosity Modifier

Kraft lignin (90 g) and lysine sulphate (90 g) were added to 70° C. water (656 mL) and adjusted to pH 11 with sodium hydroxide solution (40%, 66 g). After dissolving the pH was adjusted to pH 9 with formic acid (40%, 85 g) and water (170 mL). Sulfited pine bark tannin (30 g) was added after which sodium sulphite (10 g) was also added while stirring continued. Soy flour 7B (300 g) was added and stirring continued for 60 minutes. Boric acid (1.6 g) was added and the adhesive cooled. The adhesive has 36% solids and 420 cP viscosity was applied to wood fibre and an MDF panel formed pressing at 180° C.

Example 14. Lignin:Tannin:Soy Plywood

Kraft lignin (90 g) and lysine.$H_2SO_4$ (90 g) were added to water and adjusted to pH 10.5 with caustic solution. Upon heating to 70° C., the pH was adjusted to pH 9 with formic acid solution and sulfited pine bark tannin (30 g) added. After 15 minutes sodium sulfite (8.1 g) was added followed by addition of soy flour (300 g). The solution was heated for a further 60 minutes before cooling to 50° C. After 2 hours the solution was cooled to room temperature during which boric acid (5 g) was added to give a formulation with 34-40% solids content. Plywood glue mix additives (2% modal bark flour and 1% wheat flour) were mixed into the formulation and the resulting adhesive spread onto radiata pine veneers at a spread rate of 300 g/m² and a 3-5 ply panel laid up. After 5 mins open assembly, the panel was cold pressed and then hot pressed (170° C. for 600 sec). The resulting plywood has a dry bond rating of 8-10 and cold water soak bond rating of at least 5-6 in accord with AS/NZS 2098.2:2006.

Example 15. Zein:Tannin:Soy Plywood

Corn gluten meal (100 g) was suspended in water, adjusted to pH 11 and heated at 90° C. for 45 mins. Sulfited pine bark tannin (10 g) was added and the pH reduced to pH 9 with formic acid solution. After 10 mins, a further portion of tannin (10 g) was added and allowed to stir in over 20 mins. Sodium sulfite (8 g) was added followed by soy flour (300 g). The solution was heated at 70° C. for 60 minutes then cooled to 50° C. with stirring continued for a further 2 hours. On cooling to room temperature boric acid (1.7 g) was added to give a formulation with 20-24% solids content. A plywood glue mix was formed by adding 2% modal bark flour and 1% wheat flour and the adhesive applied to radiata pine veneer (300 g/m²). Pressing at 170° C. for 600 sec gave a plywood having dry bond ratings of 8-10 and cold water soak bond ratings of up to 5 as determined by AS/NZS 2098.2:2006.

Example 16. Lignin:Tannin:Soy Plywood

Kraft lignin (90 g) and lysine.$H_2SO_4$ (90 g) were added to water and adjusted to pH 11.2. After heating to 70° C. the pH was adjusted pH 9 with formic acid solution and mimosa tannin (30 g) added together with sodium sulfite (8 g). After 15 minutes, soy flour (300 g) was added followed by calcium carbonate (18 g) and stearic acid (10 g). Heating was continued for 60 minutes before cooling to 50° C. Boric acid (1.6 g) was added and the stirred for a further 2 hours before cooling to room temperature to give a 36% solids content formulation. A plywood glue mix was formed by adding 2% modal bark flour and 1% wheat flour and the adhesive applied to radiata pine veneer (300 g/m²). The plywood panels were pressed at 170° C. for 600 sec. Excellent dry adhesive strengths (bond ratings of 8-10) were achieved with cold water soak bond ratings of 1-2 as determined by AS/NZS 2098.2:2006.

Example 17. Lignin:Tannin:Soy Plywood

Kraft lignin (90 g) and lysine.$H_2SO_4$ (90 g) were added to water and adjusted to pH 10.9 and heated to 70° C. The pH was adjusted pH 9 with formic acid solution and mimosa tannin (30 g) added together with sodium sulfite (8 g). Over 15 minutes, soy flour (300 g) calcium carbonate (18 g) and zinc stearate (10 g) were added and heating continued for 60 minutes before cooling to 50° C. After stirring for 2 hours boric acid (5 g) was added and the formulation cooled to room temperature before further adjusting to pH 6. The formulation retains a viscosity of ca. 200 cP over 14 days. Plywood panels formed with this adhesive have dry bond strengths with cold water soak bond ratings of 4-5 as determined by AS/NZS 2098.2:2006.

Example 18. Lignin:Tannin:Soy MDF

Kraft lignin (90 g) and lysine.$H_2SO_4$ (90 g) were added to water and adjusted to pH 11.4 on heating to 70° C. After adjusting to pH 9 with formic acid solution, sulfited quebracho tannin (30 g) was added together with sodium sulfite (8 g) and glycerol (60 g). Over 15 minutes, soy flour (300 g) and calcium carbonate (18 g) were added. Heating was continued for 60 minutes before cooling to 50° C. After stirring for 2 hours the formulation was cooled to room temperature and boric acid (8 g) added. The formulation which had 38% solids content was split into two portions and one further adjusted to pH 6. Each has a viscosity <300 cP after 14 days. MDF panels prepared with either formulation have internal bond strength values as determined by AS/NZS:4266 of around 0.45 MPa with resin loadings of 8-10%.

The component ratios e.g. of zein:tannin or soy-lignin:tannin:protein are important to impart functionality and determine adhesive characteristics of specific formulations. The specific ratios will be determined by the purpose and targeted material properties of the adhesive. Typical ratios for adhesives useful for the manufacture of MDF and plywood as described herein.

Ratios may be expressed by dry weight of the raw materials or ingredients used to provide particular components of the adhesive (e.g. polypeptides, polysaccharides, lignins, tannins, etc.) or by dry weight of the actual components in the raw materials (e.g. the actual soy protein components of soy meal). The ratios are not by mole ratio. Unless stated otherwise, ratios are by dry weight of the actual components indicated in the raw material or ingredient used to provide those particular components.

The terms "ingredient" and "raw material", and related terms such as "ingredients" and "raw materials", are used interchangeably herein to refer to a composition that provides a component of the adhesive. The composition may consist of or consist essentially of the component. Alternatively, the composition may comprise, in addition to the component, one or more other components. For example, a soy flour ingredient or raw material that provides a soy component may comprise 50% soy component (e.g. soy protein) and 50% other components (i.e. components other than soy).

Zein (Z):Tannin (T):Soy (S) Ratios

With the type of raw materials (i.e. ingredients) described in the above examples the preferred ratio for the zein-tannin-soy formulation is generally approximately 5:1:5 (Z:T:S) by weight of the raw materials. But a range of ratios can be used.

Based on raw materials weight, the zein to tannin ratio can be anywhere from around 20:1 to 3:1, preferably between 7:1 and 3:1 and most preferably around 5:1.

If ratios are calculated by dry weight of the actual components in the raw materials (e.g. the actual amount of zein in a zein raw material) the ratios may change considerably.

The zein:tannin ratio can range between 15.5:1 to 2:1 by dry weight of the actual components in the raw materials (but most preferably around 3.9:1 in the instances where a second charge of tannin is added).

In terms of raw materials, the tannin to soy ratio by weight ranges between 1:3 to 1:15, 1:3 to 1:12, or 1:4 to 1:10, preferably 1:5. This equates to a tannin:soy ratio by dry weight of actual components in the raw materials of 1:2 to 1:6 and preferably around 1:2.8.

Overall, the ratio of zein to tannin to soy (Z:T:S) by dry weight of the actual components in the raw materials is preferably about (3-5):1:(2-6).

TABLE 1

Examples of component ratios (by weight) of components in raw materials.

| | Zein:tannin:soy ratio by dry weight of raw materials | | | |
|---|---|---|---|---|
| Ingredient | 6.7:1:6.7 Amt (g) | 5:1:5 Amt (g) | 6.7:1:5 Amt (g) | 5:1:3.5 Amt (g) |
| Avon Gold | 80.0 | 40.0 | 80.0 | 40.0 |
| Tannin 1 (first charge) | 4.0 | 4.0 | 4.0 | 4.0 |
| Tannin 2 (second charge) | 8.0 | 4.0 | 8.0 | 4.0 |
| Soy Flour 7B | 80.0 | 40.0 | 60.0 | 30.0 |
| Boric Acid | 0.36 | 0.24 | 0.36 | 0.24 |
| Total (g) | 172.4 | 88.2 | 152.4 | 78.2 |
| Water (to give 30% solids formulations) | 402 | 206 | 336 | 182 |
| Zein:tannin 1 by dry weight of components in raw materials | 15.6:1 | 7.8:1 | 15.6:1 | 7.8:1 |
| Zein:tannin (total) by dry weight of components in raw materials | 5.2:1 | 3.9:1 | 5.2:1 | 3.9:1 |
| Soy:tannin (total) by dry weight of components in raw materials | 3.7:1 | 2.5:1 | 2.8:1 | 2.1:1 |

Zein (Z)-Lignin (L):Tannin (T):Soy (S) Ratios

For the zein:lignin:tannin:soy formulations described above the formulation may be around 5:3:1:(3-15) or 5:3:1:(3-12), the preferred formulation being around 5:3:1:10 (Z:L:T:S) based on raw material weight.

By dry weight of actual components within the raw materials:
 the Z:L ratio is quite flexible and can range for more than 3.7:1 to less than 0.74:1 but is preferably around 1.2:1.
 the Z:T ratio may range from 1:1 to 5:1, preferably 1.9:1 to 4.7:1, more preferably 2.3:1 to 3.9:1 and most preferably around 3.9:1.
 the S:T ratio should then be about 3:1 to 7:1, preferably 2.8:1 to 6.7:1 and most preferably around 5.5:1.

So the preferred Z:L:T:S ratio by dry weight of components in the raw materials is approximately (1.9-4.7):(2-5):1:(2.8-6.7) and most preferably about 3.6:3:1:5.6.

Lignin (L):Tannin (T):Soy (S) Ratios

For the lignin:tannin:soy formulations described above the preferred formulation is around (3-5):1:10 (L:T:S) based on raw material weight.

This formulation typically includes the addition of an amino acid such as lysine (preferably at least 50% purity or better) in a ratio of 5:1 to 1:2 and preferably around 1:1 (lignin:lysine) by raw material weight. These ratios will be between 10:1 to 1:1 and preferably 3:1 by dry weight of lysine and lignin in the lysine and lignin raw materials.

By raw material weight the tannin is added to give an ingredient ratio of 2.5:1 to 6:1 (lignin:tannin), preferably between 3:1 and 5.1:1 and most preferably around 3:1. The ratio of lignin:tannin by dry weight of the lignin and tannin in the lignin and tannin raw materials may range from 2:1 to 7:1, preferably 2.6:1 to 6.3:1. More preferably 3:1 to 5.3:1 and most preferably around 3.2:1.

By raw material weight soy protein is added to bring the soy:tannin ratio to between 3:1 to 15:1, 3:1 to 12:1, or 5:1 to 12:1, preferably around 10:1. The ratio of soy:tannin by dry weight of soy and tannin in the soy and tannin raw materials are between 2:1 to 7:1, preferably between 2.8:1 to 6.7:1 and most preferably around 5.6:1.

The use of formaldehyde chemistry results in changes to the ratios. In an adhesive that used formaldehyde chemistry, the following lignin to tannin to soy (L:T:S) formulations were each prepared. These vary from the various lignin:tannin and soy:tannin ratios described in earlier examples.

Lignin, lysine and formaldehyde were added to water and adjusted to pH 10.5. The Mannich type reaction was carried out by heating for 4 hours at 90° C. before cooling to 70° C. and adjusting to pH 9. The remaining addition of tannin, soy flour and any other additives followed examples described earlier.

TABLE 2

Various formulations of lignin:tannin:soy (by dry weight of actual components in the raw materials)

| | Lignin:tannin:soy ratio by dry weight of raw materials | | | | |
|---|---|---|---|---|---|
| Ingredient | 5:1:10 Amt (g) | 3:1:10 Amt (g) | 5:1:7.5 Amt (g) | 3:1:7.5 Amt (g) | 3:1:15 Amt (g) |
| Lignin | 30 | 30 | 30 | 30 | 2.8 |
| Lysine•HCl | 14 | 14 | 14 | 14 | 1.3 |
| Formaldehyde | 2.2 | 2.2 | 2.2 | 2.2 | 0.2 |
| Tannin | 6 | 10 | 6 | 10 | 0.9 |
| Soy flour 7B | 60.0 | 100 | 45 | 75 | 14.0 |
| Boric acid | 0.2 | 0.4 | 0.2 | 0.4 | — |
| Total (g) | 112.4 | 156.6 | 97.4 | 131.6 | 19.2 |
| Water (to give 30% solids formulations) | 262 | 366 | 228 | 306 | 45 |
| Lignin:lysine by dry weight of components in raw materials | 4:1 | 4:1 | 4:1 | 4:1 | 4:1 |
| Lignin:tannin by dry weight of components in raw materials | 5.3:1 | 3.2:1 | 5.3:1 | 3.2:1 | 3.3:1 |
| Soy:tannin by dry weight of components in raw materials | 5.6:1 | 5.6:1 | 4.2:1 | 4.2:1 | 8.6:1 |

In the above example, formaldehyde was used to promote lignin-lysine crosslinking via a Mannich-type reaction.

Alternatively, lignin and tannin may be directly coupled together by reaction. One method is reaction of lignin with an aldehyde followed by coupling with tannin. Another example of grafting lignin and tannin is the lignin-glyoxal-tannin reaction where lignin and glyoxal are first reacted and then the reaction product coupled with tannin.

The addition of additives such as formaldehyde may require an adjustment in the component ratios. In the above case because the formaldehyde adds crosslinking the soy component can be greater.

The adhesives can be applied by atomisation to wood fibre, particles, flakes and strands by mechanical blending or via a blowline and the resinated wood furnish formed into a mattress prior to hot-pressing.

The adhesives can also be applied by atomisation, roller or curtain coating wood veneers followed by veneer layup and pressed to give plywood, laminated veneer lumber, veneer overlays or other wood veneer products.

Consolidation via hot-pressing can use a range of temperatures, closure rates and hold times specific to the wood panel product which ensures dehydration and cure of the adhesive component with densification of wood furnish or veneer into the forming panel.

In another embodiment an adhesive composition or adhesive precursor composition as described herein can be applied in aqueous or powder form to traditional adhesives and resins such as urea formaldehyde resin and then applied to wood furnish or veneers in the usual manner.

Adhesives of the type described can be applied to wood fibre, particles and veneer, etc. using standard application methods and equipment and can be pressed and cured in accordance with press schedules not substantially different to those currently utilised in industry.

For the adhesive to fully set to give final crosslinking and coupling between composite components, the adhesive after application is at least partially dehydrated. Dehydration can be achieved by water loss and water migration to the lignocellulosic substrate and by heat applied in the pressing and curing stages involved in forming of composites.

Following addition of the protein or protein-rich or amino acid component the adhesive is in the form of an aqueous suspension or dispersion. The formulations may be used directly or stored (e.g. for a finite period, preferably at 20° C. or below) or dried into a powder for reconstitution at point of application.

The resulting wood composites have material properties substantially similar to those made with formaldehyde based resins.

It is not the intention to limit the scope of the invention to the abovementioned examples only. As would be appreciated by a skilled person in the art, many variations are possible without departing from the scope of the invention.

The invention claimed is:

1. An aqueous adhesive composition comprising a macromolecular complex, the complex comprising:
    (A) a first component comprising:
        (i) a framework element selected from
            (a) a polypeptide, oligopeptide, amino acid, polyamine, or any combination of any two or more thereof,
            (b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule, or
            (c) a lignin, a lignan or a lignin conjugate comprising a lignin and a second linker molecule; and
        (ii) a polyphenol comprising a tannin, a tannic acid, a flavonoid, a poly-resorcinol or any combination of any two or more thereof; and
    (B) a second component comprising a polypeptide, oligopeptide, amino acid, polyamine or any combination of any two or more thereof;
        wherein the ratio of framework element to polyphenol is from about 20:1 to about 1:1 by dry weight; and
        wherein the ratio of polyphenol to second component is from about 1:1 to about 1:8 by dry weight.

2. The adhesive of claim 1, wherein the ratio of framework element (a) to polyphenol is from about 15.5:1 to about 2:1 by dry weight.

3. The adhesive of claim 1, wherein the ratio of framework element (b) to polyphenol is from about 3:1 to about 7:1 by dry weight.

4. The adhesive of claim 1, wherein the ratio of framework element (c) to polyphenol is from about 7:1 to about 2:1 by dry weight.

5. The adhesive of claim 1, wherein the first linker molecule and second linker molecule are each independently selected from:
(a) a polypeptide, oligopeptide, amino acid, or any combination of any two or more thereof;
(b) an inorganic polyhydroxylated non-metal compound or an ester or a salt thereof;
(c) an amine compound or a salt thereof;
(d) a thiol compound or a salt thereof;
(e) a metal ion;
(f) an aldehyde compound; or a carboxylic acid compound or a salt, ester, anhydride or halide thereof; and
(g) any combination of any two or more thereof.

6. The adhesive of claim 5, wherein the first linker molecule is a polyhydroxylated boron, phosphorus, silicon, or sulfur compound or an ester or salt thereof.

7. The adhesive of claim 5, wherein the second linker molecule is an amine compound selected from a natural amino acid, an unnatural amino acid having at least 2 carbon atoms, a polyamine having at least 2 carbon atoms, and a hydroxyamine having at least 2 carbon atoms, or a salt thereof.

8. The adhesive of claim 5, wherein the second linker molecule is a thiol compound comprises at least two carbon atoms; a thiol group; and at least one additional functional group capable of forming covalent or non-covalent bonds in the lignin conjugate.

9. The adhesive of claim 5, wherein the second linker is an aldehyde comprising from about 1 to about 12 carbon atoms.

10. The adhesive of claim 5, wherein the second linker comprises an aldehyde comprising from about 1 to about 12 carbon atoms and an amine compound.

11. The adhesive of claim 5, wherein the second linker molecule comprises a polyhydroxylated boron, phosphorus, silicon, or sulfur compound or an ester or salt thereof and a carboxylic acid compound or a salt, ester, anhydride or halide thereof.

12. The adhesive of claim 1, wherein one or more of the second component, the framework element (a), the first linker molecule, or the second linker molecule comprises a zein, soy, keratin, gluten, casein, or whey polypeptide or oligopeptide, or any combination of any two or more of said zein, soy, keratin, gluten, casein, or whey polypeptide or oligopeptide.

13. The adhesive of claim 1, wherein the composition comprises one or more protein denaturing agents.

14. The adhesive of claim 1, wherein the composition comprises one or more additives selected from the group consisting of organic solvents, surfactants, dispersants, viscosity modifiers, and hydrophobizing agents.

15. A process for producing an aqueous adhesive composition comprising a macromolecular complex, the process comprising:
(1) providing an aqueous composition comprising a first component, the first component comprising:
(i) a framework element selected from
(a) a polypeptide, oligopeptide, amino acid, polyamine, or any combination of any two or more thereof,
(b) a polysaccharide, oligosaccharide, monosaccharide, or any combination of any two or more thereof, or a saccharide conjugate comprising a polysaccharide, oligosaccharide, monosaccharide, or any combination of any two or more thereof and a first linker molecule, or
(c) a lignin, a lignan or a lignin conjugate comprising a lignin and a second linker molecule; and
(ii) a polyphenol comprising a tannin, a tannic acid, a flavonoid, a poly-resorcinol or any combination of any two or more thereof; and
(2) admixing a second component comprising a polypeptide, oligopeptide, amino acid, polyamine, or any combination of any two or more thereof to form a macromolecular complex;
wherein the ratio of framework element to polyphenol is from about 20:1 to about 1:1 by dry weight; and
wherein the ratio of polyphenol to second component is from about 1:1 to about 1:8 by dry weight.

16. The process of claim 15, wherein step (1) comprises:
(a) providing an aqueous composition comprising the framework element;
(b) admixing the polyphenol to form the first component.

17. The process of claim 16, wherein step (1)(a) comprises:
(i) providing an aqueous composition comprising (a) a polysaccharide, oligosaccharide, monosaccharide, or any combination of any two or more thereof or (b) a first linker molecule; and
(ii) admixing the other of (a) or (b) to form a saccharide conjugate; or
(i) providing an aqueous composition comprising (a) a lignin or (b) a second linker molecule; and
(ii) admixing the other of (a) or (b) to form a lignin conjugate.

18. The process of claim 15, wherein the providing of step (1) comprises solubilising, dissolving, dispersing, or suspending the first component in an aqueous solution.

19. The process of claim 18, wherein the admixing of step (2) is carried out at alkaline pH or elevated temperature or both.

20. The process of claim 19, wherein the pH is from about 8 to about 13.

21. The process of claim 19 wherein the temperature is from about 50 to about 95° C.

22. The process of claim 15, wherein the admixing of step (2), further comprises adjusting one or more conditions to form the macromolecular complex.

23. The process of claim 22, wherein adjusting one or more conditions comprises reducing the pH or temperature or both.

24. The process of any one of claim 15, the admixing of step (2) further comprises admixing further second component.

25. The process of any one of claim 15, wherein the admixing of step (2) is carried out under conditions that inhibit or prevent coagulation in the reaction mixture.

26. The process of any one of claim 15, wherein the second component is admixed in combination with or after admixing one or more additives that enhances the solubilisation, dissolution, dispersion, or suspension of the second component.

27. A process for producing a lignocellulosic composite, the process comprising applying the adhesive composition of claim 1 to lignocellulosic fibres, particles, flakes, strands, chips, or sheets; and forming a composite from the fibres, particles, flakes, strands, chips or sheets.

28. The adhesive of claim 1, wherein the framework element is selected from (a) or (b), and the polyphenol comprises a mixture of a tannin and a lignin.

29. The adhesive of claim 1, wherein the polyphenol comprises a tannin.

* * * * *